(12) United States Patent
Suzuki

(10) Patent No.: US 12,350,839 B2
(45) Date of Patent: Jul. 8, 2025

(54) ROBOT SYSTEM, METHOD, AND COMPUTER PROGRAM FOR PERFORMING SCRAPING PROCESS

(71) Applicant: Fanuc Corporation, Yamanashi (JP)

(72) Inventor: Tadanori Suzuki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 290 days.

(21) Appl. No.: 18/023,522

(22) PCT Filed: Sep. 1, 2021

(86) PCT No.: PCT/JP2021/032167
§ 371 (c)(1),
(2) Date: Feb. 27, 2023

(87) PCT Pub. No.: WO2022/054674
PCT Pub. Date: Mar. 17, 2022

(65) Prior Publication Data
US 2023/0311317 A1  Oct. 5, 2023

(30) Foreign Application Priority Data
Sep. 8, 2020 (JP) ................................. 2020-150703

(51) Int. Cl.
*B25J 9/16* (2006.01)
*B25J 11/00* (2006.01)
*B26D 3/08* (2006.01)

(52) U.S. Cl.
CPC ......... *B25J 9/1664* (2013.01); *B25J 11/0055* (2013.01); *B26D 3/08* (2013.01)

(58) Field of Classification Search
CPC ....... B25J 9/1664; B25J 11/0055; B26D 3/08; B26D 5/005
See application file for complete search history.

(56) References Cited

U.S. PATENT DOCUMENTS 5,931,071 A * 8/1999 Mori .................... B25J 11/0055
83/76
6,926,050 B2 * 8/2005 Kuwahara .............. B23D 79/10
144/115

(Continued)

FOREIGN PATENT DOCUMENTS

| CN | 108544508 A | 9/2018 |
| JP | 05123921 A | 5/1993 |

(Continued)

OTHER PUBLICATIONS

International Search Report and Written Opinion for International Application No. PCT/JP2021/032167, dated Nov. 22, 2021, 5 pages.

*Primary Examiner* — Omar Flores Sanchez
(74) *Attorney, Agent, or Firm* — Buchanan Ingersoll & Rooney PC

(57) ABSTRACT

There is a need for a technology for executing a high quality scraping process with a robot. A robot system includes a robot configured to move a scraper for scraping a surface of a workpiece and a control device configured to control the robot. The control device is configured to abut the scraper against the surface in a trajectory, which is inclined so as to form an acute angle with respect to the surface, by moving the scraper by the robot in a direction along the surface and in a direction toward the surface, and during the scraper abutting against the surface, control a position of the robot such that a pressing force, by which the robot presses the scraper against the surface, becomes a predetermined magnitude while moving the scraper by the robot in the direction along the surface, to perform the scraping process.

10 Claims, 26 Drawing Sheets

(56) References Cited

U.S. PATENT DOCUMENTS

| | | | |
|---|---|---|---|
| 10,065,217 B2 | 9/2018 | Nagatsuka | |
| 2009/0199690 A1* | 8/2009 | Sun | B25J 9/1664 |
| | | | 901/41 |
| 2022/0203491 A1* | 6/2022 | Fuse | B26D 5/00 |
| 2024/0051138 A1* | 2/2024 | Suzuki | B23D 79/02 |
| 2024/0051171 A1* | 2/2024 | Suzuki | B25J 9/1633 |
| 2024/0051172 A1* | 2/2024 | Suzuki | B25J 11/005 |

FOREIGN PATENT DOCUMENTS

| | | | |
|---|---|---|---|
| JP | 2004042164 A | 2/2004 |
| JP | 2010240809 A | 10/2010 |
| JP | 2016137551 A | 8/2016 |
| JP | 6723623 B1 | 7/2020 |

\* cited by examiner

FIG. 6
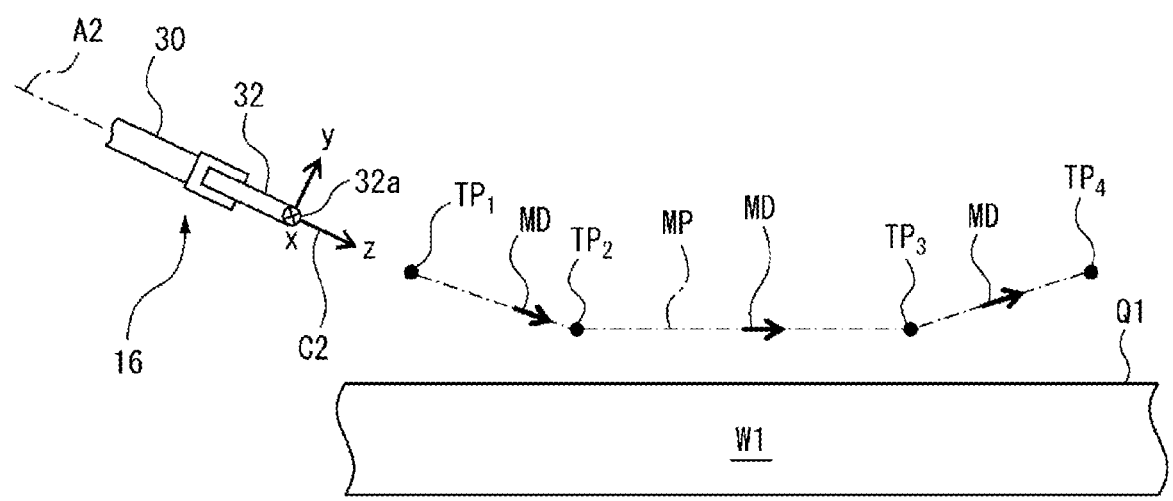
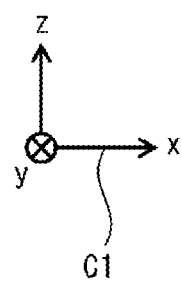

FIG. 7
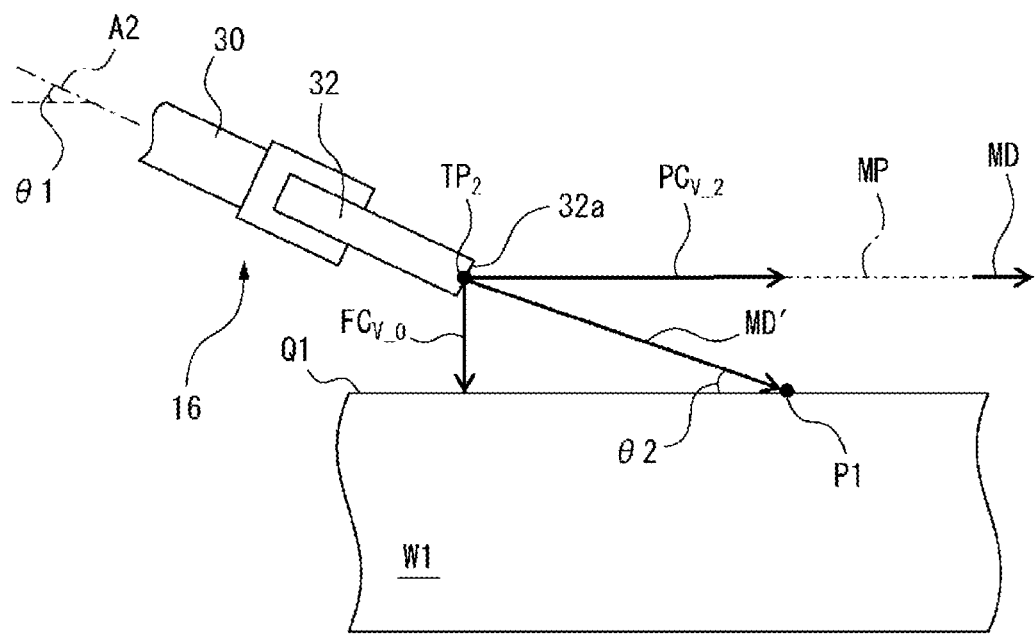
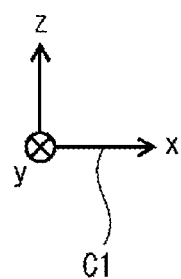

FIG. 8
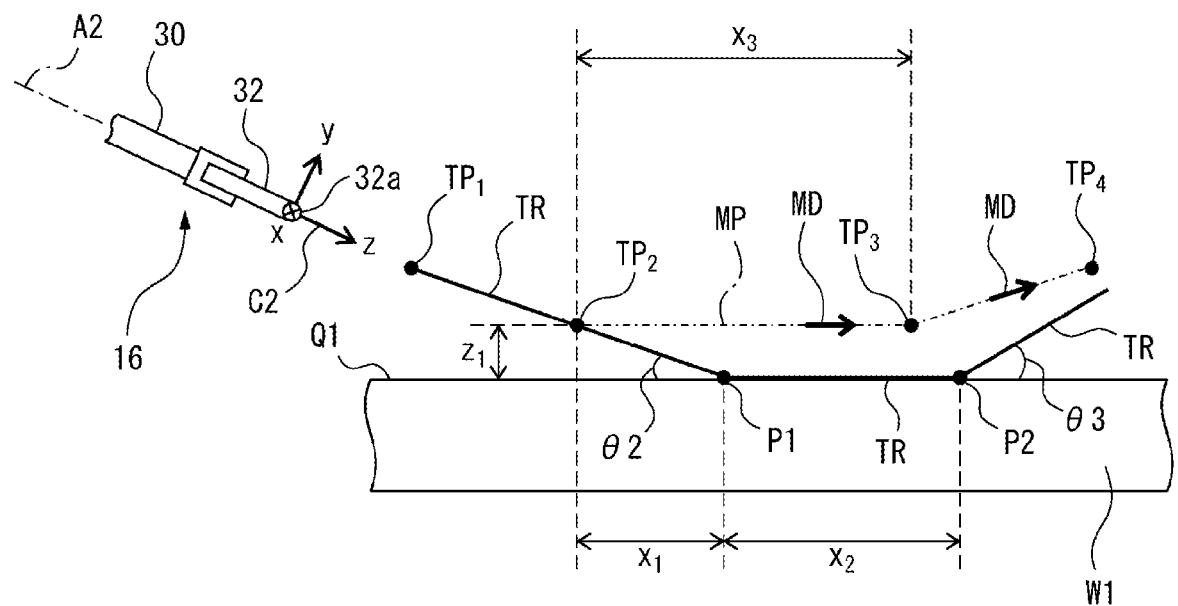
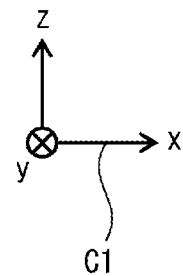

FIG. 10
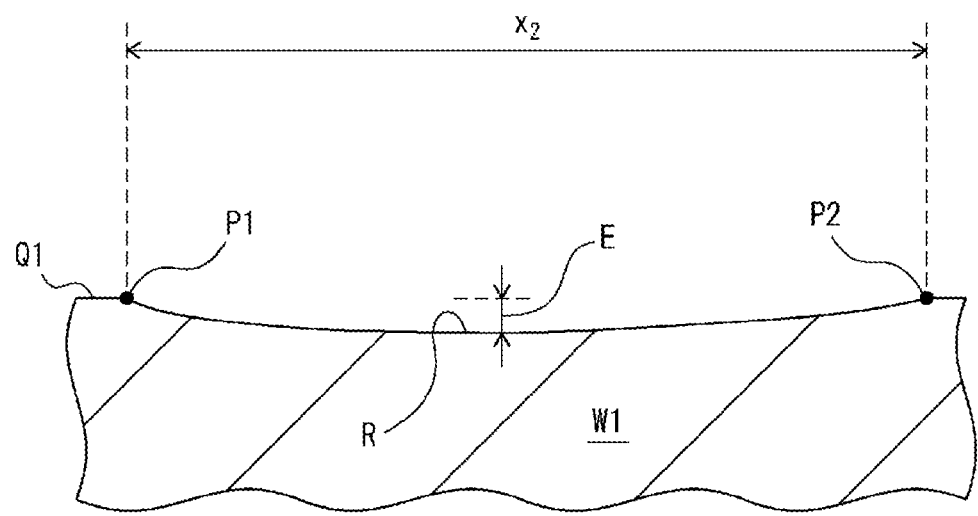
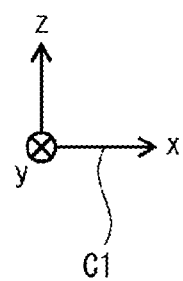

FIG. 11
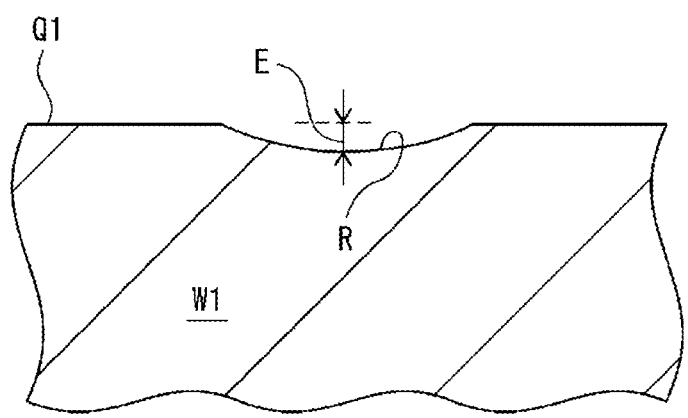
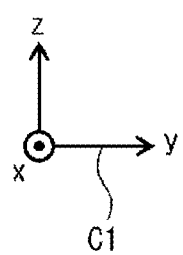

FIG. 17
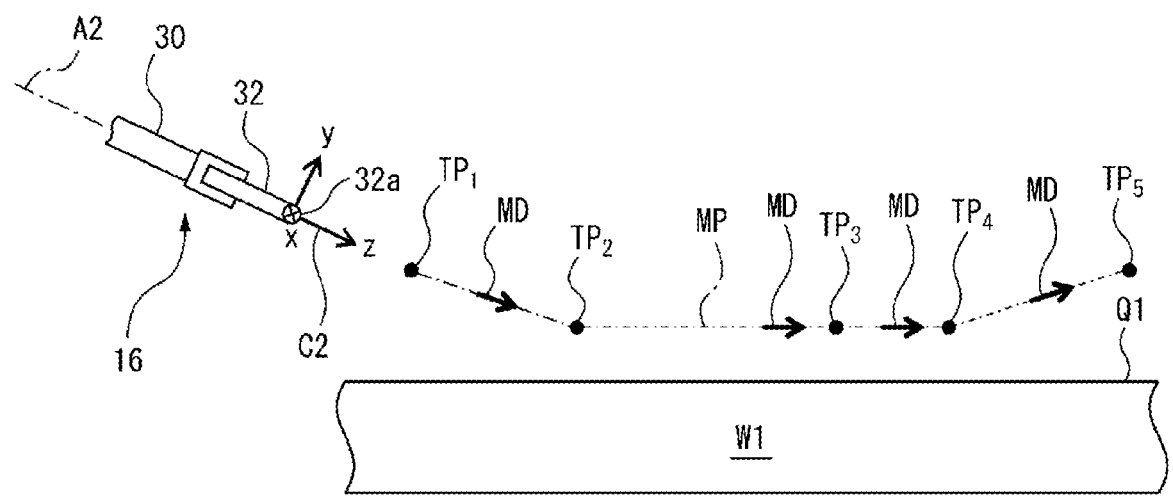
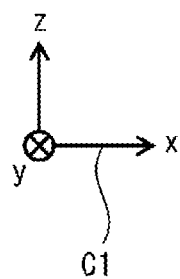

FIG. 19
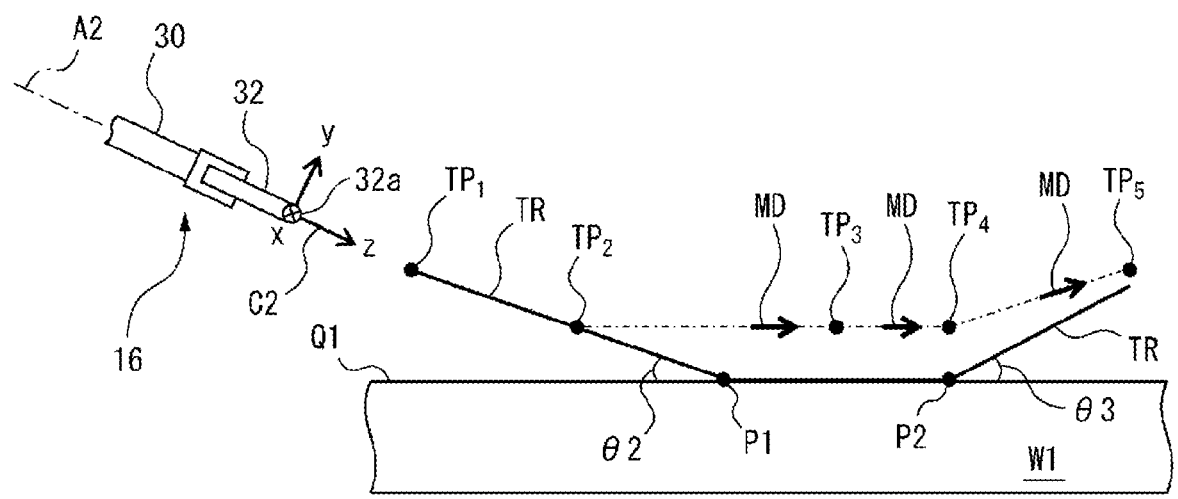
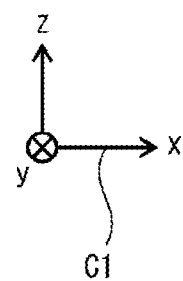

FIG. 21
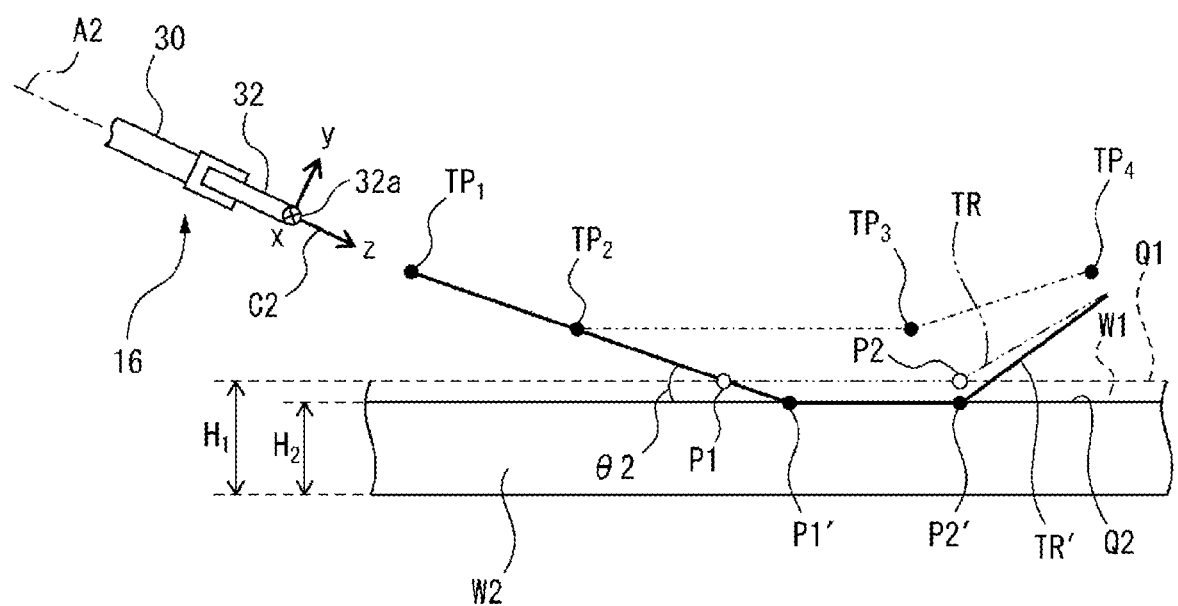
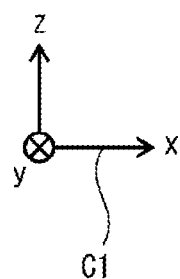

FIG. 24
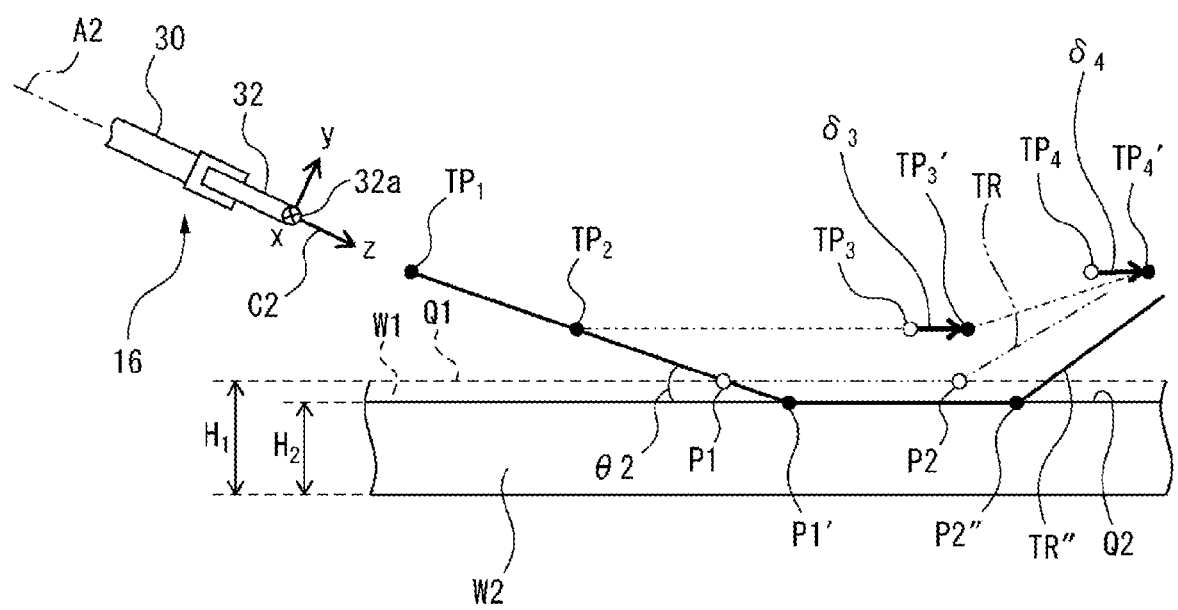
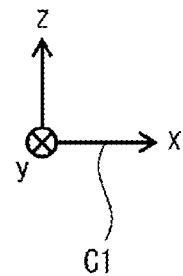

ROBOT SYSTEM, METHOD, AND COMPUTER PROGRAM FOR PERFORMING SCRAPING PROCESS

CROSS REFERENCE TO RELATED APPLICATIONS

This is the U.S. National Phase application of PCT/JP2021/032167, filed Sep. 1, 2021, which claims priority to Japanese Patent Application No. 2020-150703, filed Sep. 8, 2020, the disclosures of each of these applications being incorporated herein by reference in their entireties for all purposes.

FIELD OF THE INVENTION

The present invention relates to a robot system, a method, and a computer program for performing a scraping process.

BACKGROUND OF THE INVENTION

There is a known robot that performs a scraping process (e.g., Patent Document 1).

PATENT LITERATURE

Patent Document 1: JP 2004-042164 A

SUMMARY OF THE INVENTION

There is a need for a technology for executing a high quality scraping process with a robot.

In one aspect of the present disclosure, a robot system configured to perform a scraping process to scrape and smoothen a surface of a workpiece includes a robot configured to move a scraper for scraping the surface, and a control device configured to control the robot. The control device is configured to abut the scraper against the surface in a trajectory, which is inclined so as to form an acute angle with respect to the surface, by moving the scraper by the robot in a direction along the surface and in a direction toward the surface, and during the scraper abutting against the surface, control a position of the robot such that a pressing force, by which the robot presses the scraper against the surface, becomes a predetermined magnitude while moving the scraper by the robot in the direction along the surface, to perform the scraping process.

In another aspect of the present disclosure, a method of performing a scraping process to scrape and smoothen a surface of a workpiece, using a robot configured to move a scraper for scraping the surface, includes abutting the scraper against the surface in a trajectory, which is inclined so as to form an acute angle with respect to the surface, by moving the scraper by the robot in a direction along the surface and in a direction toward the surface, and during the scraper abutting against the surface, controlling a position of the robot such that a pressing force, by which the robot presses the scraper against the surface, becomes a predetermined magnitude while moving the scraper by the robot in the direction along the surface, to perform the scraping process.

According to the present disclosure, the scraping process can be executed by a robot with quality equivalent to a scraping process executed by an expert.

BRIEF DESCRIPTION OF DRAWINGS

FIG. 6 illustrates an example of teaching points set with respect to a surface of a workpiece.

FIG. 7 is a diagram explaining a speed command as a position control command and a speed command as a force control command.

FIG. 8 illustrates a trajectory in which a scraper actually moves during a scraping process.

FIG. 10 schematically illustrates a recess formed by the scraping process.

FIG. 11 schematically illustrates a recess formed by the scraping process.

FIG. 17 illustrates another example of teaching points set with respect to a surface of a workpiece.

FIG. 19 illustrates a trajectory in which the scraper actually moves during the scraping process.

FIG. 21 illustrates a trajectory in which the scraper actually moves during the scraping process executed on a workpiece having a relatively thin thickness.

FIG. 24 illustrates a trajectory in which the scraper actually moves during the scraping process executed on a workpiece having a relatively thin thickness.

DETAILED DESCRIPTION OF EMBODIMENTS OF THE INVENTION

Figure 1:
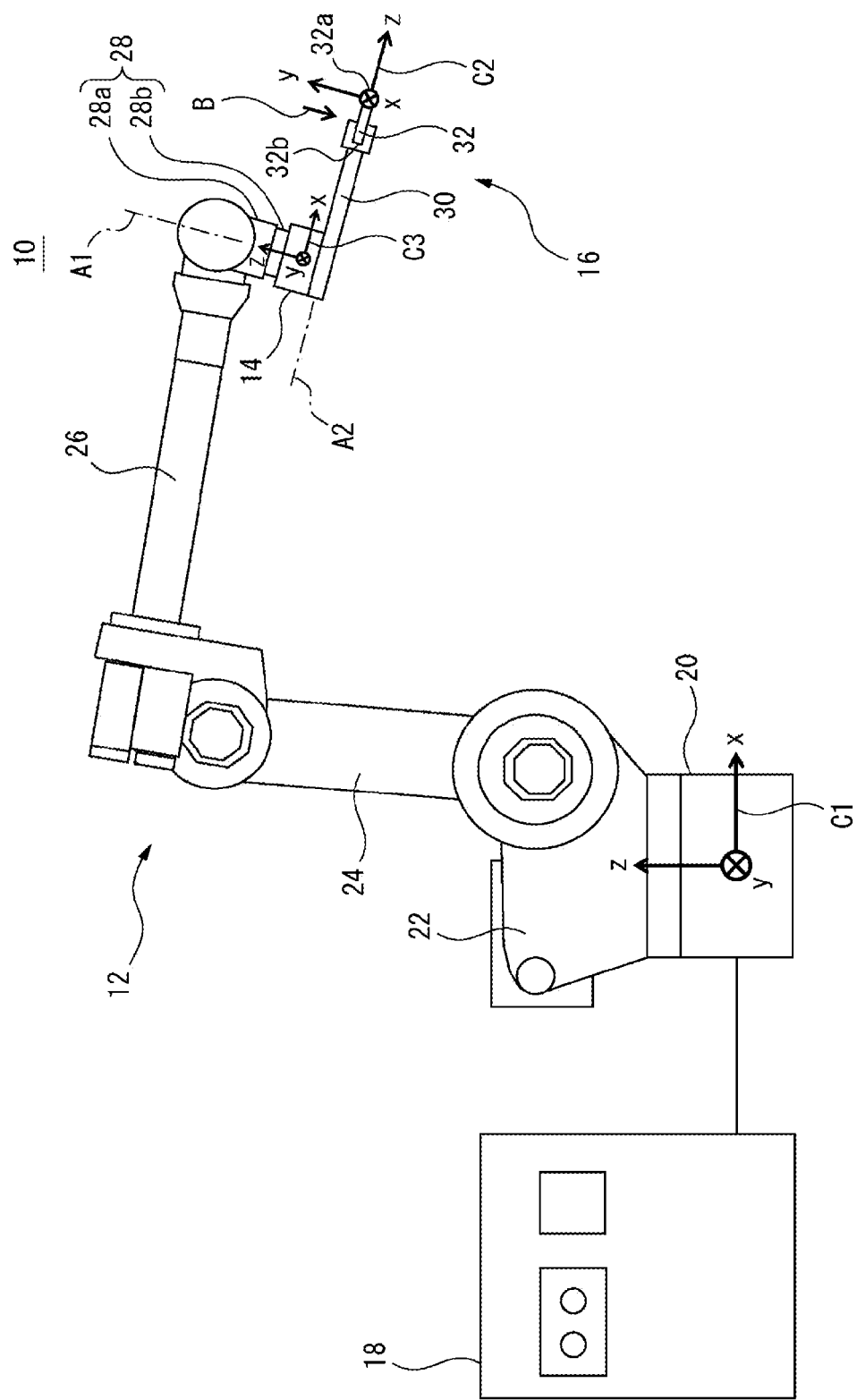
FIG. 1 is a schematic view of a robot system according to an embodiment.

Hereinafter, embodiments of the present disclosure are described in detail with reference to the drawings. In various embodiments described below, the same elements are denoted by the same reference signs, and redundant description will be omitted. In the following description, a positive x-axis direction of a robot coordinate system C1 may be referred to as rightward, a positive y-axis direction may be referred to as frontward, and a positive z-axis direction may be referred to as upward.

First, a robot system 10 according to an embodiment will be described with reference to FIG. 1. The robot system 10 is a system that performs a scraping process to scrape and smoothen a surface of a workpiece. The scraping process is a process that scrapes a surface of a workpiece such that a fine unevenness formed at the surface of the workpiece has a dimension in a thickness direction of the workpiece falling within a predetermined range (e.g., on the order of μm).

The fine unevenness serves as a so-called "oil retention" configured to store a lubricating oil. Here, the scraping process includes a rough process for making a fine unevenness formed when a surface of a workpiece is processed by a milling machine or the like to be a first dimension (e.g., 10 μm) or less, and a finishing process for making the fine unevenness to be a second dimension (e.g., 5 μm) or less which is smaller than the first dimension after the rough process.

The robot system 10 includes a robot 12, a force sensor 14, a scraper 16, and a control device 18. In the present embodiment, the robot 12 is a vertical articulated robot, and includes a robot base 20, a turning body 22, a lower arm 24, an upper arm 26, and a wrist 28. The robot base 20 is fixed on a floor of a work cell. The turning body 22 is provided at the robot base 20 to be turnable about a vertical axis.

The lower arm 24 is rotatably provided at the turning body 22 about a horizontal axis, and the upper arm 26 is rotatably provided at a distal end of the lower arm 24. The wrist 28 includes a wrist base 28a rotatably provided at a distal end of the upper arm 26, and a wrist flange 28b provided at the wrist base 28a to be rotatable about a wrist axis A1. In the present embodiment, the wrist flange 28b constitutes a hand-tip portion of the robot 12.

Figure 2:
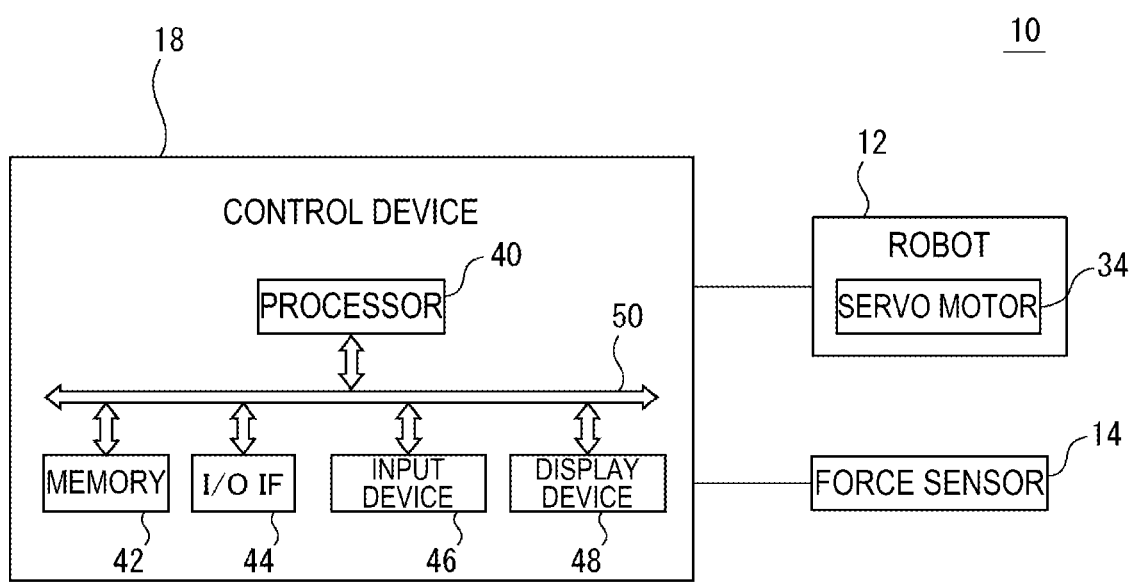
FIG. 2 is a block diagram of the robot system illustrated in FIG. 1.

A servo motor 34 (FIG. 2) is provided at each of the constituent elements (the robot base 20, the turning body 22, the lower arm 24, the upper arm 26, and the wrist 28) of the robot 12. The servomotor 34 drives each of the movable elements (the turning body 22, the lower arm 24, the upper arm 26, the wrist 28, and the hand-tip portion 28b) of the robot 12 in accordance with a command from the control device 18. As a result, the robot 12 can move and arrange the scraper 16 at any position and in any orientation.

The force sensor 14 detects a pressing force F at which the robot 12 presses the scraper 16 against a surface of a workpiece. For example, the force sensor 14 is a 6-axis force sensor including a body having a cylindrical shape and a plurality of strain gauges provided at the body, and is interposed between the hand-tip portion 28b and the scraper 16. In the present embodiment, the force sensor 14 is arranged such that a center axis of the force sensor 14 coincides with the wrist axis A1.

The scraper 16 is fixed to a distal end of the force sensor 14, and scrapes a surface of a workpiece for the scraping process. Specifically, the scraper 16 includes a flexible handle 30 and a blade portion 32 fixed to a distal end of the handle 30. The handle 30 includes a proximal end fixed to the distal end of the force sensor 14, and is connected to the hand-tip portion 28b of the robot 12 via the force sensor 14. The handle 30 extends linearly along an axis A2 from the distal end of the force sensor 14. The blade portion 32 extends along the axis A2 from a proximal end 32b to a distal end 32a of the blade portion 32. Note that the axis A2 may be substantially orthogonal to the wrist axis A1.

Figure 3:
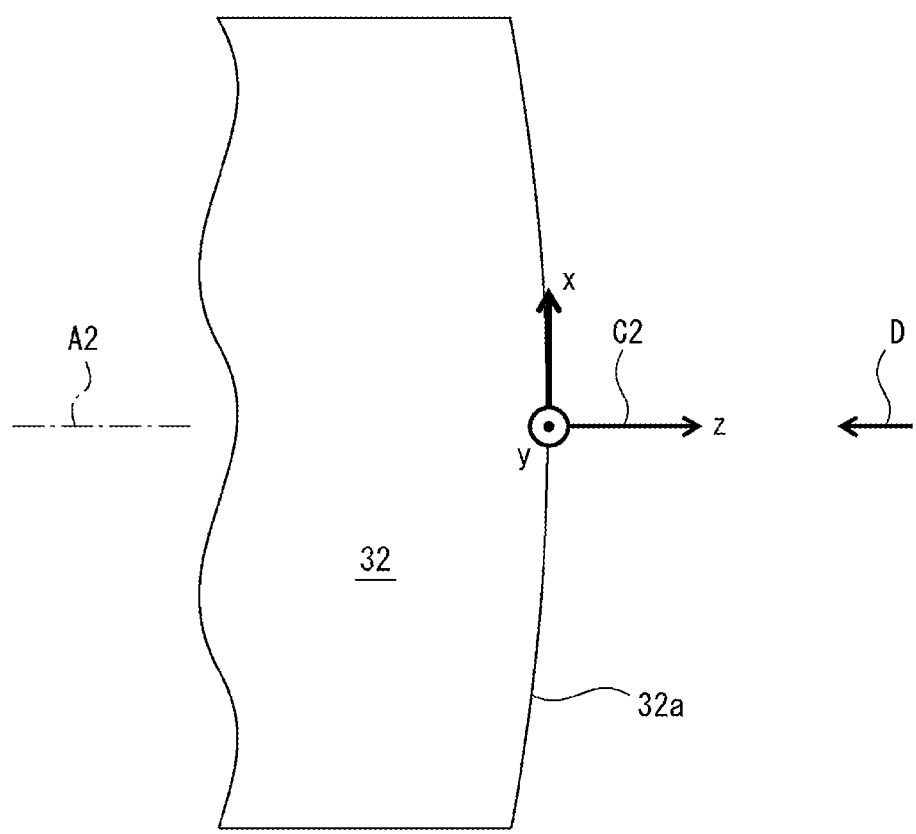
FIG. 3 is an enlarged view of a scraper illustrated in FIG. 1 as viewed from an arrow B in FIG. 1.
Figure 4:
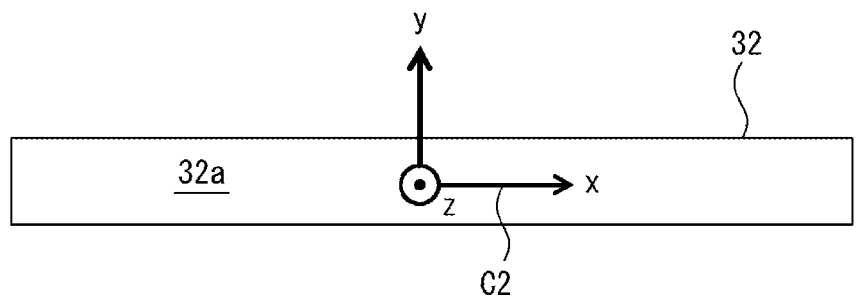
FIG. 4 is an enlarged view of the scraper illustrated in FIG. 3 as viewed from an arrow D in FIG. 3.

As illustrated in FIG. 3, when viewed from the upper side (the direction of the arrow B in FIG. 1), the distal end 32a of the blade portion 32 is curved to bulge outward as it goes from the both ends in a width direction to the center of the blade portion 32. In addition, as illustrated in FIG. 4, the distal end 32a of the blade portion 32 has a substantially rectangular outer shape when viewed from the front side (the direction of the arrow D in FIG. 3). The scraper 16 presses the distal end 32a of the blade portion 32 against a surface of a workpiece to scrape the surface with the distal end 32a.

The control device 18 controls the operations of the robot 12. Specifically, the control device 18 is a computer including a processor 40, a memory 42, an I/O interface 44, an input device 46, and a display device 48. The processor 40 is communicably connected to the memory 42, the I/O interface 44, the input device 46, and the display device 48 via a bus 50 and performs arithmetic processing for executing the scraping process while communicating with these components.

The memory 42 includes a RAM, a ROM, or the like, and stores various types of data temporarily or permanently. The I/O interface 44 includes, for example, an Ethernet (trade name) port, a USB port, an optical fiber connector, or a HDMI (trade name) terminal and performs wired or wireless data communication with an external device under a command from the processor 40. In the present embodiment, each of the servo motors 34 of the robot 12 and the force sensor 14 are communicably connected to the I/O interface 44.

The input device 46 includes a keyboard, a mouse, a touch panel, or the like, and receives data input from an operator. The display device 48 includes a liquid crystal display, an organic EL display, or the like, and visibly displays various types of data under a command from the processor 40. The input device 46 or the display device 48 may be integrally incorporated in a housing of the control device 18, or may be externally mounted at the housing of the control device 18 as a component separate from the housing.

As illustrated in FIG. 1, a robot coordinate system C1 is set for the robot 12. The robot coordinate system C1 is a coordinate system for controlling the operation of each movable element of the robot 12 and is fixed with respect to the robot base 20. In the present embodiment, the robot coordinate system C1 is set with respect to the robot 12 such that the origin of the robot coordinate system C1 is arranged at the center of the robot base 20 and the z-axis of the robot coordinate system C1 coincides with the turning axis of the turning body 22.

On the other hand, a tool coordinate system C2 is set for the scraper 16. The tool coordinate system C2 is a coordinate system that defines a position and an orientation of the scraper 16 (or the hand-tip portion 28b) in the robot coordinate system C1. In the present embodiment, the tool coordinate system C2 is set with respect to the scraper 16 such that the origin of the tool coordinate system C2 (a so-called TCP) is arranged at the center of the distal end 32a of the blade portion 32 in a state in which the handle 30 is not bending and the z-axis of the tool coordinate system C2 is parallel to the axis A2 (or a normal direction of the curved surface of the distal end 32a at the center of the distal end 32a).

When moving the scraper 16, the processor 40 of the control device 18 sets the tool coordinate system C2 in the robot coordinate system C1, and generates commands to the respective servo motors 34 of the robot 12 such that the scraper 16 is arranged at a position and in an orientation represented by the set tool coordinate system C2. In this way, the processor 40 can arrange the scraper 16 at any position and in any orientation in the robot coordinate system C1.

On the other hand, a sensor coordinate system C3 is set for the force sensor 14. The sensor coordinate system C3 is a coordinate system that defines a direction of a force acting on the force sensor 14. In the present embodiment, the sensor coordinate system C3 is set with respect to the force sensor 14 such that the origin of the sensor coordinate system C3 is arranged at the center of the force sensor 14 and the z-axis of the sensor coordinate system C3 coincides with the wrist axis A1 (or the x-axis of the sensor coordinate system C3 is parallel to the z-axis of the tool coordinate system C2).

Figure 5:
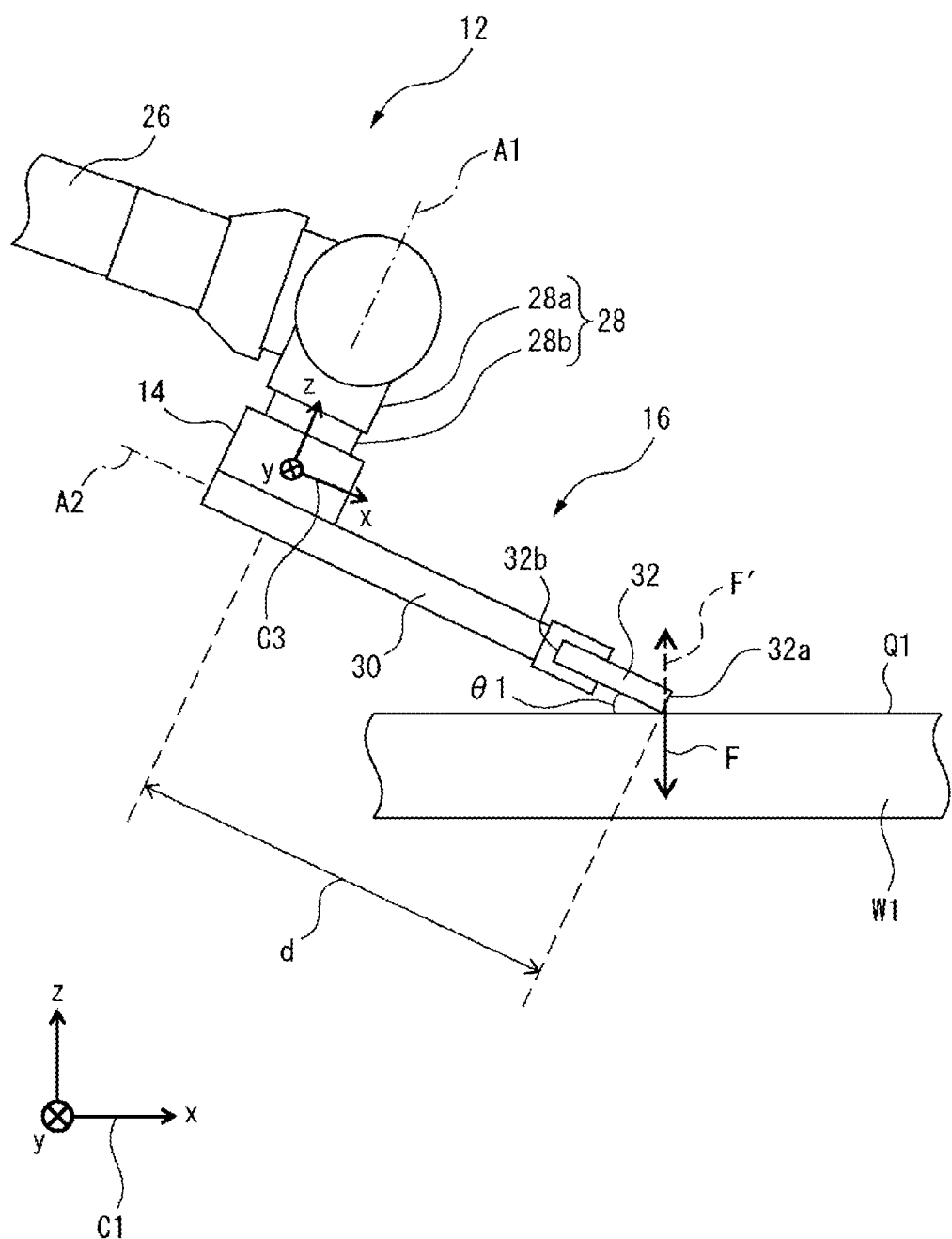
FIG. 5 illustrates a state in which the scraper illustrated in FIG. 1 is pressed against a surface of a workpiece.

FIG. 5 illustrates a state in which the robot 12 brings the distal end 32a of the blade portion 32 of the scraper 16 to abut against a surface Q1 of a workpiece W1. When the robot 12 presses the distal end 32a of the scraper 16 against the surface Q1 at a pressing force F in a direction orthogonal to the surface Q1, a reaction force F' of the pressing force F is applied from the surface Q1 to the force sensor 14 via the scraper 16.

Each of the strain gauges of the force sensor 14 transmits detection data corresponding to the force acting on the force sensor 14 at this time to the control device 18. Based on the detection data received from the force sensor 14 via the I/O interface 44, the processor 40 obtains forces f in the x-axis direction, the y-axis direction, and the z-axis direction of the sensor coordinate system C3, and torques τ around the x-axis direction, the y-axis direction, and the z-axis direction acting on the force sensor 14 at this time. The processor 40 calculates a magnitude of the reaction force F' acting on the distal end 32a of the blade portion 32 in a direction orthogonal to the surface Q1 based on the forces f, the torques τ, and state data CD of the scraper 16 at this time.

The state data CD includes, for example, at least one of an angle θ1 between the axis A2 and the surface Q1, a distance d from the wrist axis A1 (or the origin of the sensor coordinate system C3) to the distal end 32a of the blade portion 32, data indicating a position and an orientation of the tool coordinate system C2 (or the sensor coordinate system C3) in the robot coordinate system C1, and bending data of the handle 30 (for example, a bending amount or an elastic modulus of the handle 30). In this way, the force sensor 14 detects the reaction force F' as the pressing force F, and the control device 18 can determine the magnitude of the pressing force F (the reaction force F') based on the detection data of the force sensor 14.

Next, the scraping process executed by the robot system 10 will be described with reference to FIGS. 6 to 8. As illustrated in FIG. 6, a plurality of teaching points $TP_1$, $TP_2$, $TP_3$, and $TP_4$ at which the distal end 32a of the scraper 16 (i.e., the TCP) is to be positioned for executing the scraping process is set in advance along the surface Q1 of the workpiece W1.

In the present embodiment, the teaching point $TP_2$ is set at a position separated toward lower right from the teaching point $TP_1$, and the teaching point $TP_3$ is set at a position separated rightward from the teaching point $TP_2$. The positions of the teaching points $TP_2$ and $TP_3$ in the z-axis direction of the robot coordinate system C1 are substantially identical to each other. The teaching point $TP_4$ is set at a position separated toward upper right from the teaching point $TP_3$. These teaching points $TP_n$ (n=1, 2, 3, 4) are represented by coordinates in the robot coordinate system C1 and defined in a computer program CP for operating the robot 12.

The processor 40 starts a position control in performing the scraping process. Specifically, after starting the position control, the processor 40 generates position control commands PC for causing the robot 12 to move the scraper 16 to the plurality of teaching points $TP_n$ in sequence. Specifically, the processor 40 generates a position control command $PC_n$ for causing the distal end 32a of the scraper 16 to move from a teaching point $TP_n$ to a teaching point $TP_{n+1}$.

The processor 40 causes the respective servo motors 34 of the robot 12 to operate in accordance with the position control command $PC_n$, and thus the scraper 16 is positioned at the teaching points $TP_1 \rightarrow TP_2 \rightarrow p\ TP_3 \rightarrow TP_4$ in this order. Through the position control, the processor 40 causes the scraper 16 (specifically, the distal end 32a) to move along a movement path MP defined by the plurality of teaching points $TP_n$.

In the present embodiment, for ease of understanding, the surface Q1 of the workpiece W1 is substantially parallel to an x-y plane of the robot coordinate system C1, and a direction MD of the movement path MP is substantially parallel to an x-z plane of the robot coordinate system C1. The position control command $PC_n$ includes a speed command $PC_{V\_n}$ (a first speed command) defining a speed $V_{P\_n}$ at which the scraper 16 (i.e., the hand-tip portion 28b of the robot 12) is moved from the teaching point $TP_n$ to the teaching point $TP_{n+1}$.

After the start of the position control, the processor 40 starts a force control when the scraper 16 reaches the teaching point $TP_2$ in FIG. 6. In the present embodiment, the teaching point $TP_2$ is set such that the distal end 32a of the scraper 16 is separated upward from the surface Q1 when the distal end 32a is arranged at the teaching point $TP_2$. After the start of the force control, the processor 40 controls the position of the hand-tip portion 28b of the robot 12 (or TCP) such that the pressing force F at which the robot 12 presses the scraper 16 against the surface Q1 of the workpiece W1 is controlled to a target value $F_T$ based on the detection data of the force sensor 14.

Specifically, in the force control, the processor 40 generates a force control command FC for controlling the position of the hand-tip portion 28b of the robot 12 (TCP) in order to control the pressing force F (specifically, the reaction force F') obtained based on the detection data of the force sensor 14 to the target value $F_T$. Then, the processor 40 adds the force control command FC to the position control command $PC_n$ to operate the servo motors 34 of the robot 12.

Accordingly, the processor 40 causes the scraper 16 (or the hand-tip portion 28b) to move in the direction MD in accordance with the position control command $PC_n$ and causes the scraper 16 to move in a direction approaching to or separating from the surface Q1 of the workpiece W1 (i.e., the z-axis direction of the robot coordinate system C1) in accordance with the force control command FC. The force control command FC includes a speed command $FC_V$ (a second speed command) defining a speed at which the scraper 16 is moved in the z-axis direction of the robot coordinate system C1.

When the scraper 16 reaches the teaching point $TP_2$, the processor 40 generates a speed command $PC_{V\_2}$ as a position control command $PC_2$ for causing the scraper 16 to move from the teaching point $TP_2$ to the teaching point $TP_3$, and generates a speed command $FC_{V\_0}$ as the force control command FC. FIG. 7 schematically illustrates the speed command $PC_{V\_2}$ and the speed command $FC_{V\_0}$ generated by the processor 40 when the scraper 16 reaches the teaching point $TP_2$.

After the scraper 16 has reached the teaching point $TP_2$, the processor 40 causes the robot 12 to operate in accordance with the speed command $PC_{V\_2}$ and the scraper 16 is moved in the direction MD from the teaching point $TP_2$ to the teaching point $TP_3$ at a speed $V_{P\_2}$ corresponding to (specifically, coincident with) the speed command $PC_{V\_2}$.

Along with this, the processor 40 generates the speed command $FC_{V\_0}$ and adds the generated speed command to the speed command $PC_{V\_2}$ for the servo motors 34 to move the scraper 16 in a direction toward the surface Q1 (i.e., downward) at a speed $V_{F\_0}$ corresponding to the speed command $FC_{V\_0}$. As a result, the robot 12 causes the scraper 16 to move in a direction MD' in FIG. 7 after passing though the teaching point $TP_2$.

In FIG. 8, a trajectory TR that the scraper 16 (specifically, the distal end 32a) actually follows during the scraping process is indicated by a solid line. After passing through the teaching point $TP_2$, the scraper 16 moves toward the surface Q1 in the trajectory TR that is inclined to form an acute angle θ2 with the surface Q1 and abuts against the surface Q1 at a position P1. During the scraper 16 abutting against the surface Q1, the processor 40 causes the scraper 16 to move in the direction MD (i.e., rightward) along the surface Q1 in accordance with the position control command $PC_2$, and generates a speed command $FC_{V\_1}$ as the force control command FC for controlling the pressing force F to the target value $F_T$ through the force control.

In accordance with the speed command $FC_{V\_1}$, the position of the hand-tip portion 28b of the robot 12 is shifted in the z-axis direction of the robot coordinate system C1 at a speed $V_{F\_1}$ corresponding to the speed command $FC_{V\_1}$. Here, the maximum value of the speed command $FC_{V\_1}$ (i.e., the speed $V_{F\_1}$) generated during the scraper 16 abutting against the surface Q1 can be set to be larger than the speed command $FC_{V\_0}$ (i.e., the speed $V_{F\_0}$) generated before the scraper 16 abuts against the surface Q1.

Figure 9:
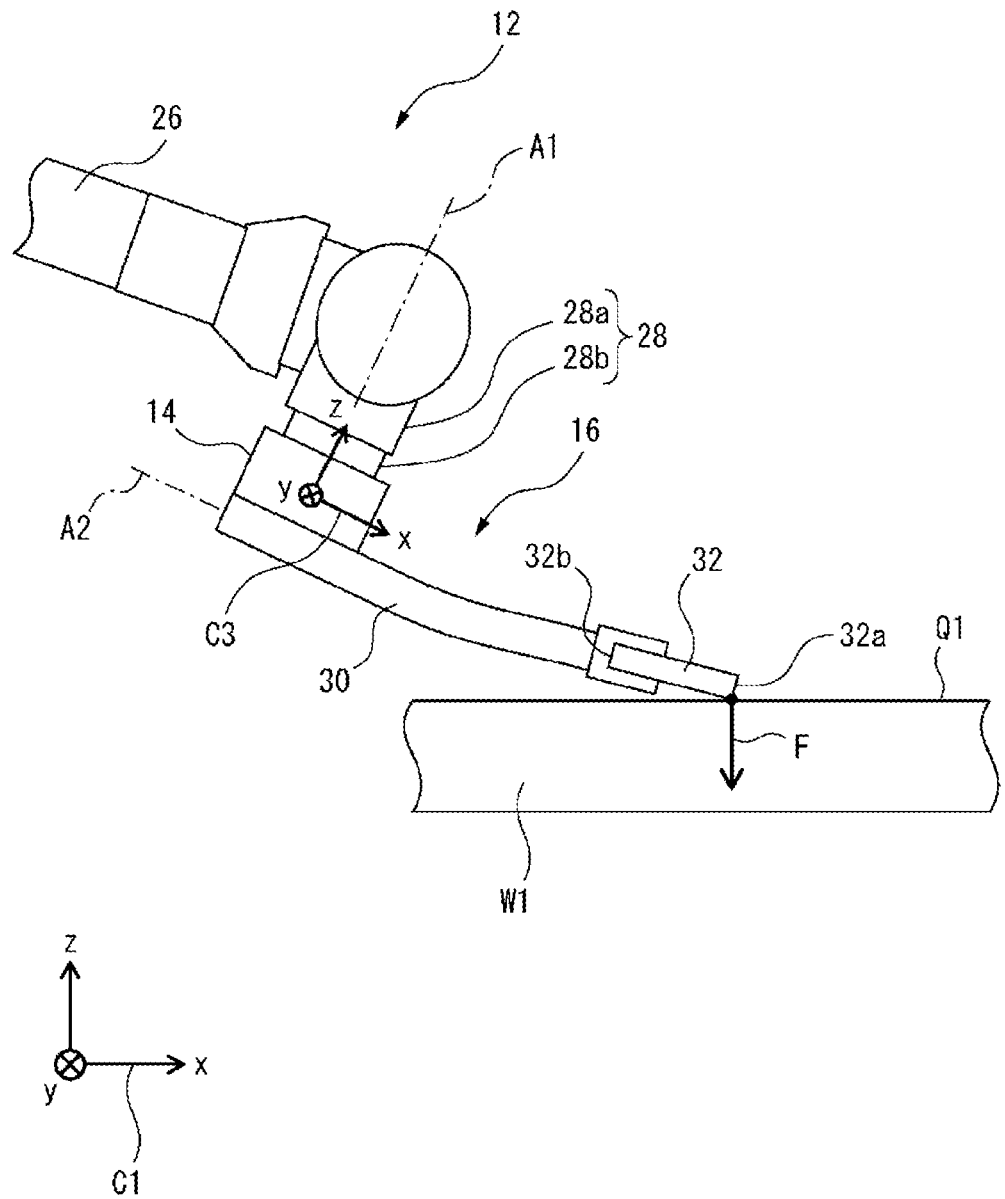
FIG. 9 schematically illustrates a state of a handle of the scraper during the scraping process.

In this way, the scraper 16 is moved rightward along the surface Q1 while being pressed at the pressing force F having a magnitude corresponding to the target value $F_T$, and thereby the scraping process is executed to scrape the surface Q1 with the distal end 32a of the scraper 16. FIG. 9 illustrates a condition of the scraper 16 during the scraping process. As illustrated in FIG. 9, during the scraping process, the robot 12 presses the distal end 32a of the scraper 16 against the surface Q1 at the pressing force F, and thereby the handle 30 of the scraper 16 bends to bulge downward. In other words, the target value $F_T$ of the force control is set as a value that can cause the handle 30 to bend during the scraping process.

Referring to FIG. 8 again, when the scraper 16 (or the hand-tip portion 28b) reaches a position corresponding to the teaching point $TP_3$, the processor 40 generates a position control command $PC_3$ for causing the scraper 16 to move to the teaching point $TP_4$. The processor 40 causes the robot 12 to operate in accordance with the position control command $PC_3$ to move the hand-tip portion 28b toward upper right. As a result, the scraper 16 moves toward upper right in the trajectory TR that is inclined to form an acute angle θ3 with the surface Q1 of the workpiece W1 and the distal end 32a of the scraper 16 is separated from the surface Q1 at a position P2. Then, the scraping process is finished.

By the scraping process executed as described above, a recess R recessed in a curved shape is formed to extend rightward from the position P1 to the position P2 in the surface Q1 as illustrated in FIG. 10 and FIG. 11. In the examples illustrated in FIG. 10 and FIG. 11, the recess R has a length $x_2$ in the x-axis direction and a depth E in the z-axis direction of the robot coordinate system C1. In FIG. 10 and FIG. 11, the depth E of the recess R is enlarged for ease of understanding, but it should be understood that the depth E of the actual recess R is approximately 10 μm or less.

In the present embodiment, the processor 40 generates the speed commands $PC_{V\_2}$ and $FC_{V\_0}$ such that the acute angle θ2 described above is within a predetermined range. Here, the inventor of the present invention found that an expert in a scraping process moves the blade portion 32 of the scraper 16 along a trajectory having an angle of 15° to 35° with respect to the surface Q1 of the workpiece W1 to cause the blade portion 32 to be abutting against the surface Q1.

Figure 12:
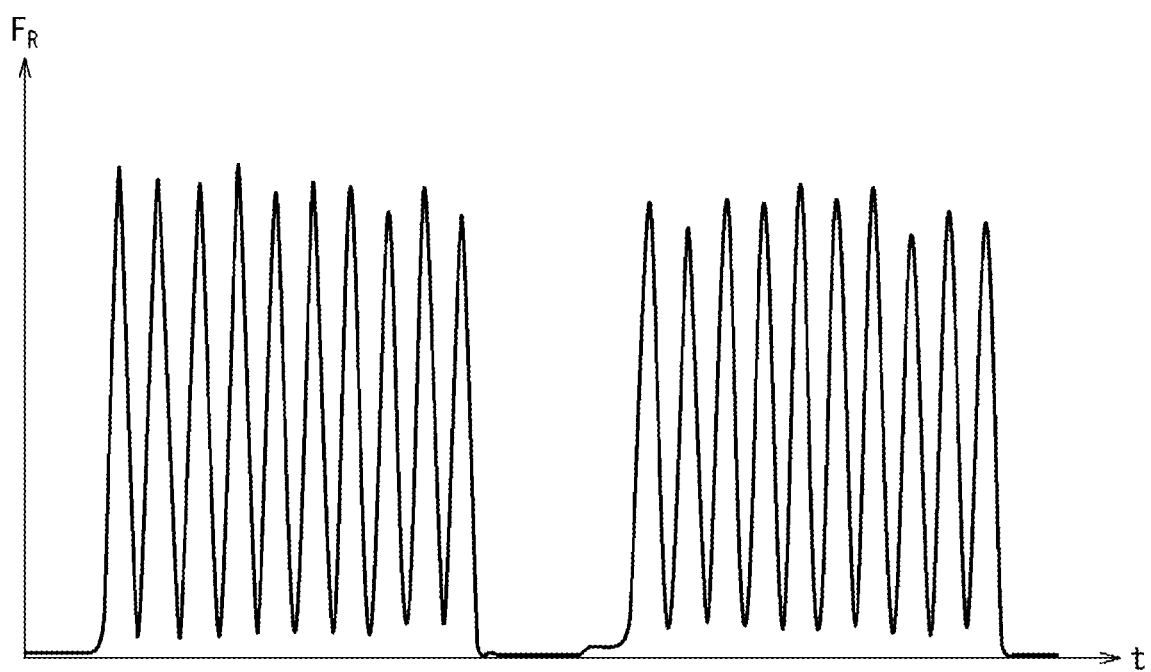
FIG. 12 illustrates a time change characteristic of a pressing force at which a scraper is pressed against a surface of a workpiece during a scraping process executed by an expert.

Also, the inventor of the present invention acquired time change characteristic data of a pressing force $F_R$ at which the blade portion 32 of the scraper 16 is pressed against the surface Q1 of the workpiece W1 when the expert consecutively executes the scraping process. The time change characteristic is illustrated in FIG. 12. Based on the time change characteristic illustrated in FIG. 12, the inventor of the present invention acquired a magnitude (a peak value of the time change characteristic) of the pressing force $F_R$ at which the expert presses the blade portion 32 against the surface Q1 during one scraping process (i.e., in forming one recess R), and found that the expert moves the blade portion 32 at a speed of about 100 [mm/sec] during the scraping process.

Here, when distances between the teaching point $TP_2$ and the position P1 in FIG. 8 in the x-axis direction and the z-axis direction of the robot coordinate system C1 are a distance $x_1$ and a distance $z_1$ respectively, the distance $x_1$, the distance $z_1$, the speed command $PC_{V\_2}$ (speed $V_{P\_2}$), and the speed command $FC_{V\_0}$ (speed $V_{F\_0}$) satisfy the following equation (1).

$$Z_1/X_1 = FC_{V\_0}/PC_{V\_2} = V_{F\_0}/V_{P\_2} \qquad (1)$$

Also, the acute angle θ2, the distance $x_1$, the distance $z_1$, the speed command $PC_{V\_2}$ (speed $V_{P\_2}$), and the speed command $FC_{V\_0}$ (speed $V_{F\_0}$) satisfy the following equation (2).

$$\Theta 2 = TAN^{-1}(Z_1/X_1) = TAN^{-1}(FC_{V\_0}/PC_{V\_2}) = TAN^{-1}(V_{F\_0}/V_{P\_2}) \qquad (2)$$

Thus, if $x_1=10$ [mm] and $z_1=5$ [mm] are set as machining conditions MC for the scraping process, then the acute angle θ2 can be determined to be θ2≈26.6° by the equation (2). In this case, as one of the machining conditions MC, when the speed $V_{P\_2}$ (i.e., the speed command $PC_{V\_2}$) is set to 100 [mm/sec] equal to the movement speed of the scraper 16 by the expert described above, the speed $V_{F\_0}$ (i.e., the speed command $FC_{V\_0}$) can be determined to be 50 [mm/sec] by the equation (1).

Alternatively, when θ2=25° and the speed command $PC_{V\_2}$ (speed $V_{P\_2}$)=100 [mm/sec] are set as the machining conditions MC, $FC_{V\_0}$ (speed $V_{F\_0}$)≈46.6 [mm/sec] can be determined by the equation (2). In this case, when $z_2=10$ [mm] is set, $x_1≈21.4$ [mm] can be determined by equation (1).

In addition, as one of the machining conditions MC, the target value $F_T$ is set to a value appropriate for a material of the workpiece W1 and a target depth E of the recess R (e.g., 100 [N]). As described above, the machining conditions MC include the distance $x_1$, the distance $z_1$, the acute angle $\theta2$, the speed $V_{F\_0}$ (speed command $FC_{V\_0}$), and the speed $V_{P\_2}$ (speed command $PC_{V\_2}$).

As a result of observation and careful study of the scraping process by the expert, the inventor of the present invention found that when the machining conditions MC are appropriately set, the acute angle $\theta2$ can be controlled to be within a range of, for example, 15° to 35°, the pressing force F can be controlled to obtain the time change characteristic similar to that in FIG. 12, and consequently the scraping process can be executed by the robot 12 with quality equivalent to the scraping performed by the expert.

Figure 13:
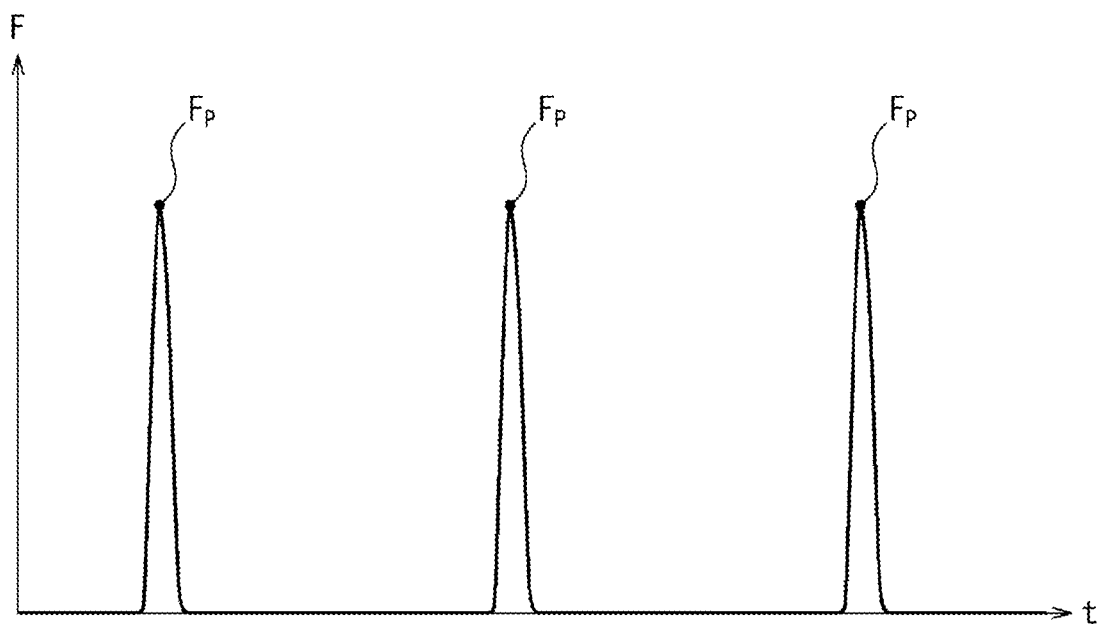
FIG. 13 illustrates a time change characteristic of a pressing force at which the robot presses the scraper against a surface of a workpiece during the scraping process executed by the robot system illustrated in FIG. 1.

FIG. 13 illustrates a time change characteristic of the pressing force F at which the blade portion 32 of the scraper 16 is pressed against the surface Q1 of the workpiece W1 when the processor 40 causes the robot 12 to operate in accordance with predetermined machining conditions MC to consecutively execute the scraping process (i.e., form a plurality of recesses R). As illustrated in FIG. 13, by causing the robot 12 to execute the scraping process in accordance with appropriately set machining conditions MC, the pressing force F during one scraping process can be controlled to have a magnitude of a time change characteristic similar to that in FIG. 12.

The time change of the pressing force F during the scraping process by the robot 12 will be described in detail below with reference to FIG. 8 and FIG. 13. After the distal end 32a of the scraper 16 abuts against the surface Q1 of the workpiece W1 at the position P1, the processor 40 generates the force control command FC (speed command $FC_{V\_1}$) and thereby causes the position of the hand-tip portion 28b of the robot 12 to shift downward at the speed $V_{F\_1}$. Accordingly, the pressing force F increases rapidly.

On the other hand, although the processor 40 generates the position control command $PC_2$ (speed command $PC_{V\_2}$) for moving the scraper 16 from the teaching point $TP_2$ to the teaching point $TP_3$ as described above, the position control command $PC_2$ becomes dominant over the force control command FC as the scraper 16 approaches the teaching point $TP_3$, and the processor 40 causes the scraper 16 (hand-tip portion 28b) to move in a direction away from the surface Q1 of the workpiece W1 (i.e., upward) before reaching a position corresponding to the teaching point $TP_3$. As a result, the magnitude of the pressing force F decreases rapidly after reaching a peak value $F_P$ illustrated in FIG. 13.

Here, in the present embodiment, in order to make the length $x_2$ of the recess R formed by the scraping process to be relatively short, a distance $x_3$ between the teaching point $TP_2$ and the teaching point $TP_3$ in the x-axis direction of the robot coordinate system C1 is set to be relatively short. In this case, the processor 40 causes the scraper 16 to move upward before the pressing force F reaches the target value $F_T$ of the force control. Thus, in the present embodiment, the peak value $F_P$ is smaller than the target value $F_T$.

Subsequently, the processor 40 causes the robot 12 to operate in accordance with the position control commands $PC_2$ and $PC_3$ such that the scraper 16 is moved toward upper right along the trajectory TR that is inclined to form the acute angle $\theta3$, and when the scraper 16 is separated from the surface Q1 at the position P2, the pressing force F becomes zero. In this way, the processor 40 controls the pressing force F during the scraping process to have a predetermined magnitude as the characteristic illustrated in FIG. 13.

Note that the "predetermined magnitude" of the pressing force F is not only the peak value $F_P$, but also includes the time change characteristic illustrated in FIG. 13. Also, in the present embodiment, the peak value $F_P$ of the pressing force F is smaller than the target value $F_T$ of the force control. The peak value $F_P$ corresponds to the target value $F_T$ and varies depending on the target value $F_T$. In other words, the peak value $F_P$ can be controlled by the target value $F_T$.

Figure 14:
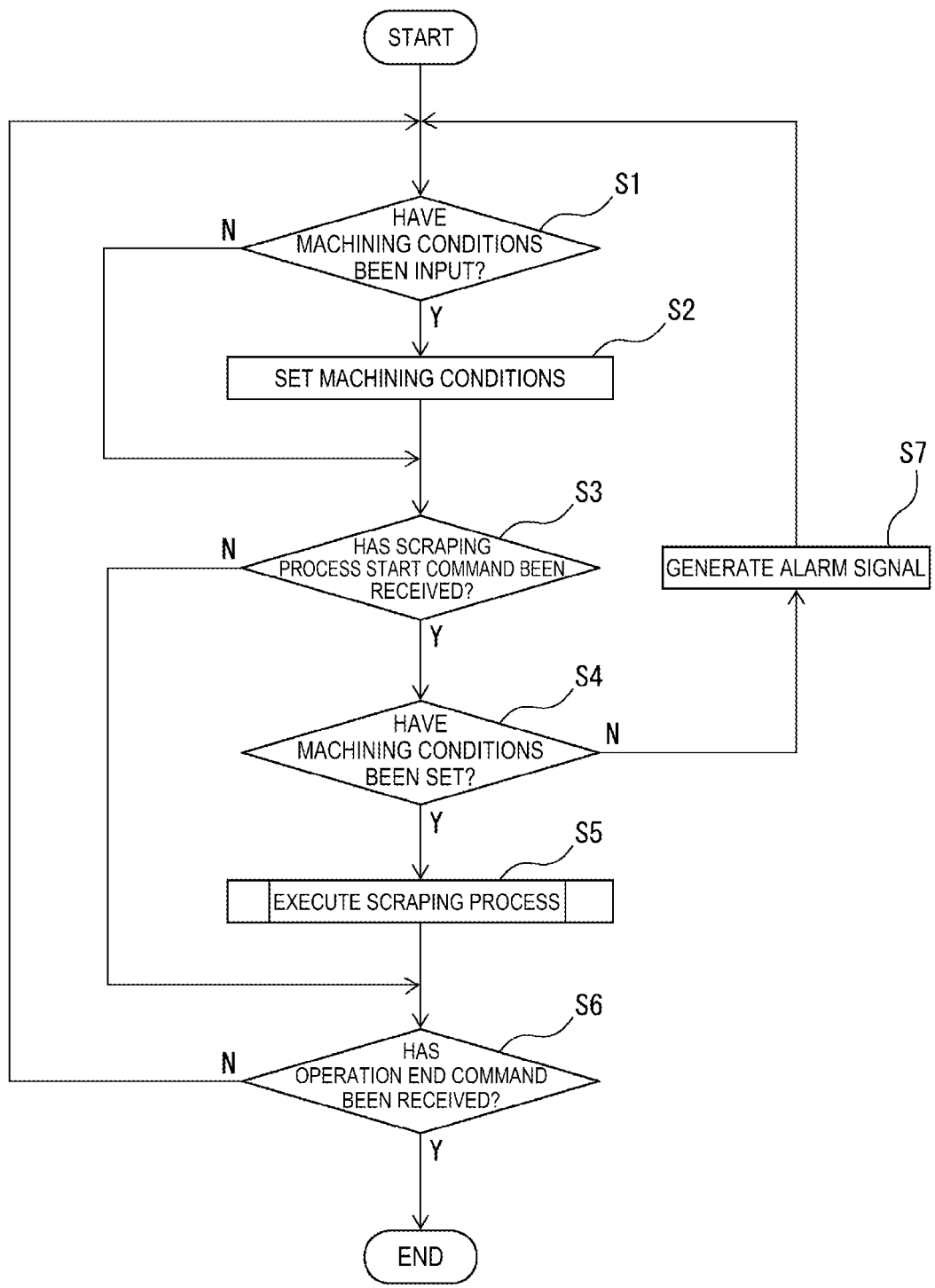
FIG. 14 illustrates an example of an operation flow of the robot system illustrated in FIG. 1.

Next, an example of the operation flow of the robot system 10 will be described with reference to FIG. 14. The processor 40 executes the flow illustrated in FIG. 14 according to the computer program CP that is stored in the memory 42 in advance. The flow illustrated in FIG. 14 is started when the control device 18 is activated, for example.

In step S1, the processor 40 determines whether or not an input of the machining conditions MC is received. For example, the processor 40 generates image data of an input screen for inputting the distance $x_1$, the distance $z_1$, the acute angle $\theta2$, the speed $V_{F\_0}$ (speed command $FC_{V\_0}$), speed $V_{P\_2}$ (speed command $PC_{V\_2}$), and the target value $F_T$ described above as the machining conditions MC, and causes the display device 48 of the control device 18 to display the image data.

An operator operates the input device 46 of the control device 18 while viewing the input screen displayed at the display device 48 to input at least three data among the distance $x_1$, the distance $z_1$, the acute angle $\theta2$, the speed $V_{F\_0}$ (speed command $FC_{V\_0}$), and the speed $V_{P\_2}$ (speed command $PC_{V\_2}$), and input the target value $F_T$ as the machining conditions MC. The processor 40 determines YES and proceeds to step S2 when the input data of the machining conditions MC is received from the input device 46, or determines NO and proceeds to step S3 when the input data of the machining conditions MC is not received.

In step S2, the processor 40 determines the machining conditions MC. For example, it is assumed that the operator inputs $x_1$=10 [mm], $z_1$=5 [mm], and $V_{P\_2}$ ($PC_{V\_2}$)=100 [mm/sec] as the machining conditions MC in step S1. In this case, from the input data of the machining conditions MC and the above-described equations (1) and (2), the processor 40 automatically determines $\theta2$=26.6° and $V_{F\_0}$ ($FC_{V\_0}$)=50 [mm/sec] as the machining conditions MC.

In this way, in the present embodiment, depending on some parameters of the machining conditions MC input by and received from the operator, the processor 40 automatically determines other parameters of the machining conditions MC. Then, the processor 40 sets $x_1$=10 [mm], $z_1$=5 [mm], $V_{P\_2}$ ($PC_{V\_2}$)=100 [mm/sec], $\theta2$=26.6°, and $V_{F\_0}$ ($FC_{V\_0}$)=50 [mm/sec], and the target value $F_T$ as the machining conditions MC.

In step S3, the processor 40 determines whether or not a scraping process start command is received from the operator, a host controller, or a computer CP. The processor 40 determines YES and proceeds to step S4 when the scraping process start command is received, or determines NO and proceeds to step S6 when the scraping process start command is not received.

In step S4, the processor 40 determines whether or not all the machining conditions MC are set. Specifically, the processor 40 determines YES and proceeds to step S5 when all of the distance $x_1$, the distance $z_1$, the acute angle $\theta2$, the speed $V_{F\_0}$ (speed command $FC_{V\_0}$), and the speed $V_{P\_2}$ (speed command $PC_{V\_2}$) are set as the machining conditions MC. On the other hand, the processor 40 determines NO and proceeds to step S7 when at least one of the distance $x_1$, the distance $z_1$, the acute angle $\theta2$, the speed $V_{F\_0}$ (speed command $FC_{V\_0}$), and the speed $V_{P\_2}$ (speed command $PC_{V\_2}$) is not set as the machining conditions MC.

Figure 15:
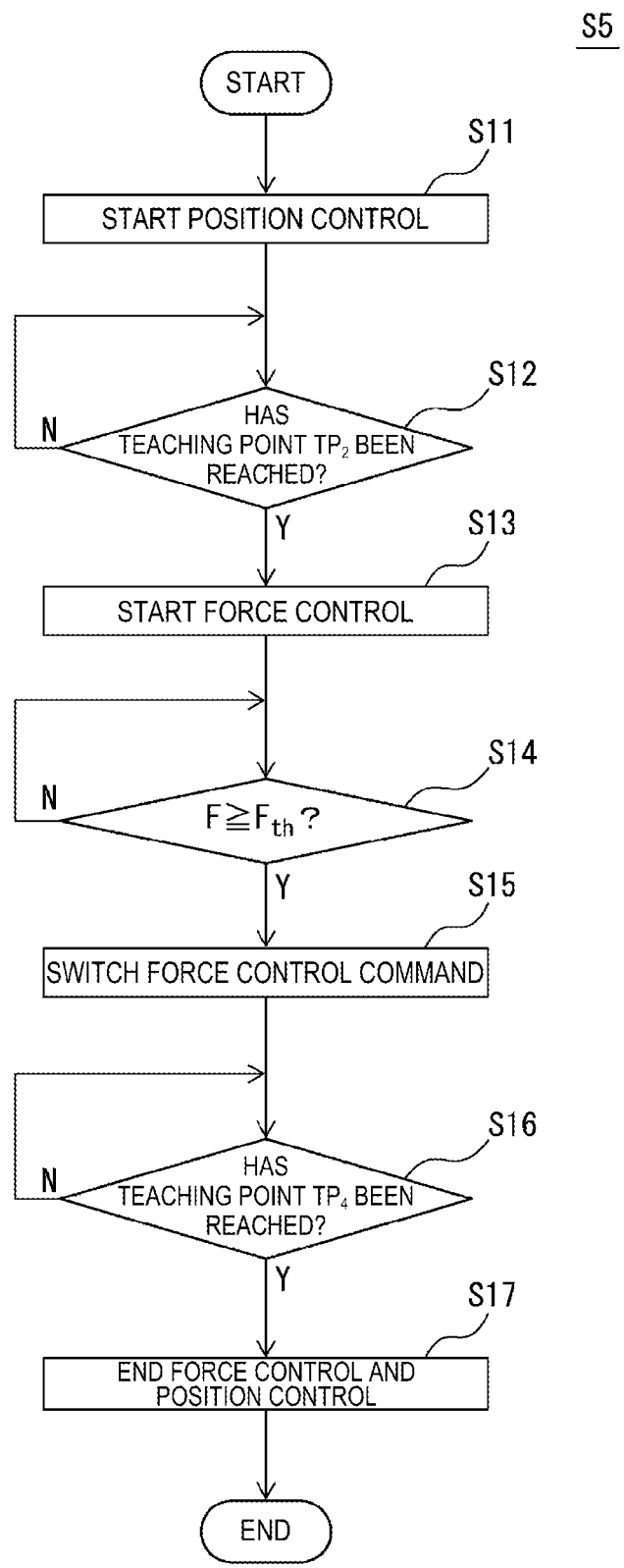
FIG. 15 illustrates an example of a flow of a step S5 in FIG. 14.

In step S5, the processor 40 executes the scraping process. The above-mentioned step S5 will be described below with reference to FIG. 15. In step S11, the processor 40 starts the position control.

Specifically, the processor 40 starts an operation of generating the above-described position control command $PC_n$ and starts an operation of causing the robot 12 to move the distal end 32a of the scraper 16 to the teaching points $TP_1 \rightarrow TP_2 \rightarrow TP_3 \rightarrow TP_4$ in this order.

In step S12, the processor 40 determines whether or not the scraper 16 has reached the teaching point $TP_2$. For example, the servo motors 34 of the robot 12 are provided with rotation detectors (encoders, Hall elements, or the like) configured to detect the rotations (specifically, rotation angles or rotational positions) of the servo motors 34.

The processor 40 can acquire position data of the scraper 16 (specifically, TCP) in the robot coordinate system C1 based on feedback from the rotation detectors, and determine whether or not the scraper 16 has reached the teaching point $TP_2$ based on the position data. The processor 40 proceeds to step S13 upon determining that the scraper 16 has reached the teaching point $TP_2$ (i.e., YES), or loops step S12 upon determining that the scraper 16 has not reached the teaching point $TP_2$ (i.e., NO).

In step S13, the processor 40 starts the force control. Specifically, the processor 40 starts an operation of generating the above-described force control command FC, and adds the force control command FC to the position control command $PC_n$ to operate the robot 12. Here, the speed command $PC_{V\_2}$=100 [mm/sec] and the speed command $FC_{V\_0}$=50 [mm/sec] are set as the machining conditions MC in step S2 described above.

Thus, the processor 40 generates the speed command $PC_{V\_2}$=100 [mm/sec] as the position control command $PC_2$, and generates the speed command $FC_{V\_0}$=50 [mm/sec] as the force control command FC. By causing the robot 12 to operate in accordance with the speed commands $PC_{V\_2}$ and $FC_{V\_0}$, the processor 40 causes the scraper 16 to move in the direction MD at the speed $V_{P\_2}$=100 [mm/sec] and move downward at the speed $V_{F\_0}$=50 [mm/sec]. As a result, the scraper 16 moves toward the surface Q1 of the workpiece W1 along the trajectory TR (FIG. 8) inclined at the acute angle θ2=26.6°. Thus, the acute angle θ2 can be controlled to be within a predetermined range (e.g., 15° to 35°).

In step S14, the processor 40 determines whether or not the pressing force F acquired based on the detection data of the force sensor 14 has become equal to or greater than a predetermined threshold value $F_{th}$ ($F \geq F_{th}$). The threshold value $F_{th}$ is set in advance by the operator as a value indicating that the distal end 32a of the scraper 16 has abutted against the surface Q1 of the workpiece W1. The processor 40 determines YES and proceeds to step S15 when $F \geq F_{th}$ is satisfied, or determines NO and loops step S14 when $F < F_{th}$ is satisfied.

In step S15, the processor 40 switches the force control command FC. Specifically, the processor 40 switches the force control command FC, to be generated, from the speed command $FC_{V\_0}$ to the speed command $FC_{V\_1}$. After switching to the speed command $FC_{V\_1}$, the processor 40 generates the speed command $FC_{V\_1}$, and in order to control the pressing force F to the target value $F_T$, the processor 40 causes the position of the hand-tip portion 28b of the robot 12 to shift in the z-axis direction of the robot coordinate system C1 at the speed $V_{F\_1}$ corresponding to the speed command $FC_{V\_1}$. As described above, the maximum value of the speed $V_{F\_1}$ (speed command $FC_{V\_1}$) can be greater than the speed $V_{F\_0}$ (speed command $FC_{V\_0}$).

In step S16, the processor 40 determines whether or not the scraper 16 (or the hand-tip portion 28b) has reached a position corresponding to the teaching point $TP_4$. Here, after the start of step S13, the processor 40 executes the position control and the force control in parallel, and thus the distal end 32a of the scraper 16 moves along the trajectory TR illustrated in FIG. 8 and passes under the teaching points $TP_3$ and $TP_4$.

In step S16, the processor 40 determines whether or not the x-coordinate of the distal end 32a (or the hand-tip portion 28b) in the robot coordinate system C1 coincides with the x-coordinate of the teaching point $TP_4$ based on the feedback from the rotation detectors described above. The processor 40 proceeds to step S17 upon determining YES, or loops step S16 upon determining NO.

Before YES is determined in step S16, the distal end 32a of the scraper 16 is separated from the surface Q1 of the workpiece W1 at the position P2 as described above. In step S17, the processor 40 ends the force control and the position control. One scraping process is completed in this way, and consequently the recess R is formed in the surface Q1 of the workpiece W1 as illustrated in FIG. 10 and FIG. 11.

Referring to FIG. 14 again, in step S6, the processor 40 determines whether or not an operation end command is received from the operator, a host controller, or the computer program CP. The processor 40 determines YES and ends the flow illustrated in FIG. 14 when the operation end command is received, or determines NO and returns to step S1 when the operation end command is not received.

On the other hand, when NO is determined in step S4, the processor 40 issues an alarm signal in step S7. For example, the processor 40 generates an alarm signal indicating "Please set machining conditions" by voice or image, and outputs the alarm signal to the operator via a speaker (not illustrated) or the display device 48 provided in the control device 18. Then, the processor 40 returns to step S1.

As described above, in the present embodiment, the processor 40 causes the robot 12 to bring the scraper 16 to abut against the surface Q1 of the workpiece W1 in the trajectory TR inclined at the acute angle θ2. Then, the processor 40 controls the pressing force F to a predetermined magnitude (FIG. 13) during the scraper 16 abutting against the surface Q1, and causes the scraper 16 to move rightward along a surface $W_S$, and thereby executes the scraping process. According to this configuration, the scraping process can be executed by the robot 12 with quality equivalent to the scraping process executed by the expert.

In addition, in the present embodiment, the processor 40 executes the force control based on the detection data of the force sensor 14 during the scraper 16 abutting against the surface Q1 of the workpiece W1, and thereby controls the position of the hand-tip portion 28b of the robot 12 in the z-axis direction of the robot coordinate system C1. According to this configuration, during the scraping process, the pressing force F can be controlled to be a predetermined magnitude as the characteristic illustrated in FIG. 13 with a high degree of accuracy.

Accordingly, the time change characteristic of the pressing force F during the scraping process executed by the robot 12 can be brought close to the time change characteristic of the pressing force $F_R$ by the expert (FIG. 12), and thus the quality of the scraping process executed by the robot 12 can be more effectively brought close to the quality by the expert.

In the present embodiment, the processor 40 causes the scraper 16 to move from the teaching point $TP_2$ to the teaching point $TP_3$ in accordance with the position control command $PC_2$ (specifically, the speed command $PC_{V\_2}$) and causes the scraper 16 to move downward in accordance with the force control command FC (specifically, the speed command $FC_{V\_0}$), and thereby causes the scraper 16 to abut against the surface Q1 of the workpiece W1 in the trajectory TR inclined at the acute angle $\theta 2$.

Then, the processor 40 generates the speed commands $PC_{V\_2}$ and $FC_{V\_0}$ such that the acute angle $\theta 2$ is within a predetermined range (for example, 15° to 35°). According to this configuration, the acute angle $\theta 2$ of the trajectory TR can be controlled to be within a desired range with a high degree of accuracy by the position control command $PC_2$ (speed command $PC_{V\_2}$) and the force control command FC (speed command $FC_{V\_0}$). Accordingly, the quality of the scraping process executed by the robot 12 can be more effectively brought close to the quality by the expert.

In the present embodiment, the processor 40 causes the scraper 16 to move in a direction away from the surface Q1 of the workpiece W1 (i.e., upward) before the pressing force F reaches the target value $F_T$ during the execution of the force control, and thereby ends the scraping process. According to this configuration, the time change characteristic of the pressing force F during one scraping process (FIG. 13) can be effectively brought close to the time change characteristic of the pressing force $F_R$ by the expert (FIG. 12). Also, the recess R can be formed in a curved shape that is recessed in a center portion of the recess R as illustrated in FIG. 9. Accordingly, the quality of the scraping process can be improved.

In the present embodiment, during the execution of the scraping process, the processor 40 separates the scraper 16 away from the surface Q1 of the workpiece W1 in the trajectory TR that is inclined to form the acute angle $\theta 3$ with respect to the surface Q1, and thereby ends the scraping. According to this configuration, the recess R can be formed in a curved shape, and thus the quality of the scraping process can be improved.

Note that the acute angle $\theta 3$ can be controlled by adjusting the positions of the teaching points $TP_3$ and $TP_4$, or by adjusting the angle between the movement path MP from the teaching point $TP_2$ to the teaching point $TP_3$ and the movement path MP from the teaching point $TP_3$ to the teaching point $TP_4$. As an example, the acute angle $\theta 3$ is controlled to be an angle of 14° to 20°.

In the present embodiment, the target value $F_T$ of the force control (i.e., the magnitude of the pressing force F) is defined such that the handle 30 bends as illustrated in FIG. 9 when the blade portion 32 is pressed against the surface Q1 of the workpiece W1 during the execution of the scraping process. According to this configuration, micro vibrations of the blade portion 32 occurred during the scraping process can be absorbed by the bending of the handle 30, and the pressing force F can uniformly act from the blade portion 32 to the surface Q1. As a result, the surface of the recess R can be prevented from being formed in a wavy shape, and thus the quality of the scraping process can be improved.

Note that the processor 40 may control the orientation of the wrist such that the axis A2 of the scraper 16 becomes parallel to the direction MD' (i.e., the trajectory TR from the teaching point $TP_2$ to the position P1) in FIG. 7 (i.e., $\theta 1=\theta 2$) during the scraping process. Alternatively, the processor 40 may control the orientation of the wrist such that $\theta 1<\theta 2$ (or $\theta 1>\theta 2$) is satisfied (i.e., the axis A2 and the direction MD' are not parallel to each other).

In the embodiment described above, a case has been described in which the processor 40 causes the scraper 16 to move upward before the pressing force F reaches the target value $F_T$ during the execution of the force control. However, no such limitation is intended, and the processor 40 may cause the scraper 16 to move upward when the pressing force F reaches the target value $F_T$ during the execution of the force control. In that case, while the time change characteristic of the pressing force F becomes similar to that in FIG. 13, the peak value $F_P$ becomes equal to the target value $F_T$.

As an example, the pressing force F can be controlled such that the peak value $F_P$ becomes equal to the target value $F_T$ by setting the distance $x_3$ between the teaching point $TP_2$ and the teaching point $TP_3$ to be longer than that in the above-described embodiment. Alternatively, the processor 40 can also control the pressing force F such that the peak value $F_P$ becomes equal to the target value $F_T$ by increasing the speed command $FC_{V\_1}$ generated during the force control after the blade portion 32 abuts against the surface Q1 of the workpiece W1 (after YES is determined in step S14 described above).

Also, the processor 40 may continuously execute the scraping process such that the pressing force F is continuously maintained at the target value $F_T$ after the pressing force F reaches the target value $F_T$ by the force control. For example, when the distance $x_3$ between the teaching point $TP_2$ and the teaching point $TP_3$ is set to be longer and the processor 40 executes the flows of the FIG. 14 and FIG. 15, the scraping process is continuously performed such that the pressing force F is continuously maintained at the target value $F_T$.

Figure 16:
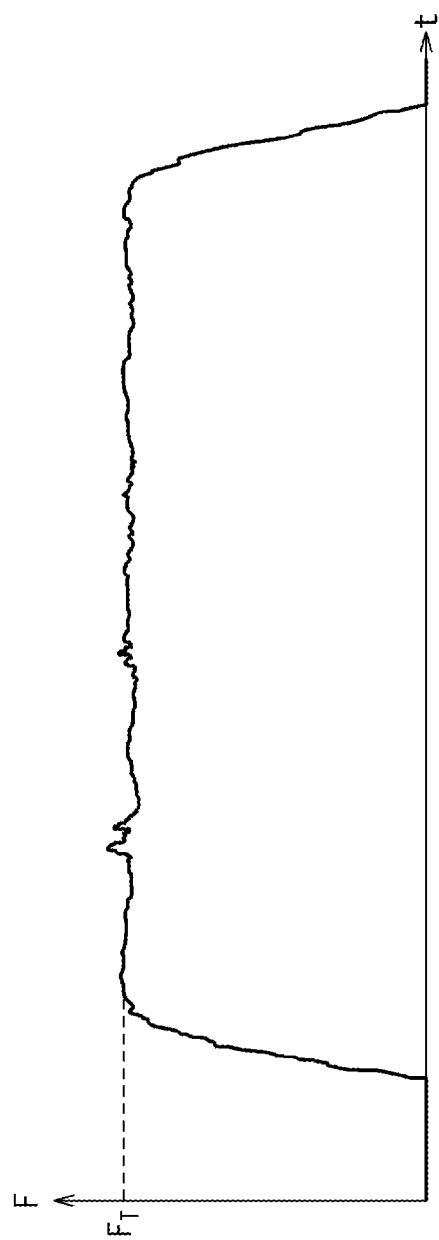
FIG. 16 illustrates another example of a time change characteristic of a pressing force at which the robot presses the scraper against a surface of a workpiece during the scraping process executed by the robot system illustrated in FIG. 1.

FIG. 16 illustrates the time change characteristic of the pressing force F during the scraping process described above. After the scraper 16 passes through the teaching point $TP_2$ and then abuts against the surface Q1 of the workpiece W1 at the position P1, the pressing force F rapidly increases and becomes substantially coincident with the target value $F_T$. Subsequently, the processor 40 generates the force control command FC (specifically, the speed command $FC_{V\_1}$) and controls the position of the hand-tip portion 28b of the robot 12 such that the pressing force F is continuously maintained at the target value $F_T$ while the scraper 16 is caused to move rightward toward the teaching point $TP_3$ in accordance with the position control command $PC_2$.

Next, as in the case of the embodiment described above, the processor 40 causes the scraper 16 to move upward before the scraper 16 reaches a position corresponding to the teaching point $TP_3$ (specifically, a position below the teaching point $TP_3$). As a result, the pressing force F rapidly decreases, and when the blade portion 32 of the scraper 16 is separated from the surface Q1 of the workpiece W1 at the position P2, the pressing force F becomes zero.

In this way, the processor 40 controls the pressing force F during the scraping process to have a predetermined magnitude as the characteristic illustrated in FIG. 16. According to the present embodiment, the recess R having a relatively long length $x_2$ can be formed by the robot 12 with quality equivalent to the quality by the expert.

Note that the teaching points $TP_n$ are not limited to the configuration illustrated in FIG. 6, and any number of teaching points may be set for the workpiece W. FIG. 17 illustrates another configuration of the teaching points $TP_n$. In the configuration illustrated in FIG. 17, teaching points $TP_1$, $TP_2$, $TP_3$, $TP_4$, and $TP_5$ are set along the surface Q1 of the workpiece W1. Here, the teaching point $TP_4$ is arranged on a right side of the teaching point $TP_3$, and the positions of the teaching points $TP_2$, $TP_3$, and $TP_4$ in the z-axis direction of the robot coordinate system C1 are substantially identical to each other. The teaching point $TP_5$ is arranged on an upper right side of the teaching point $TP_4$.

Figure 18:
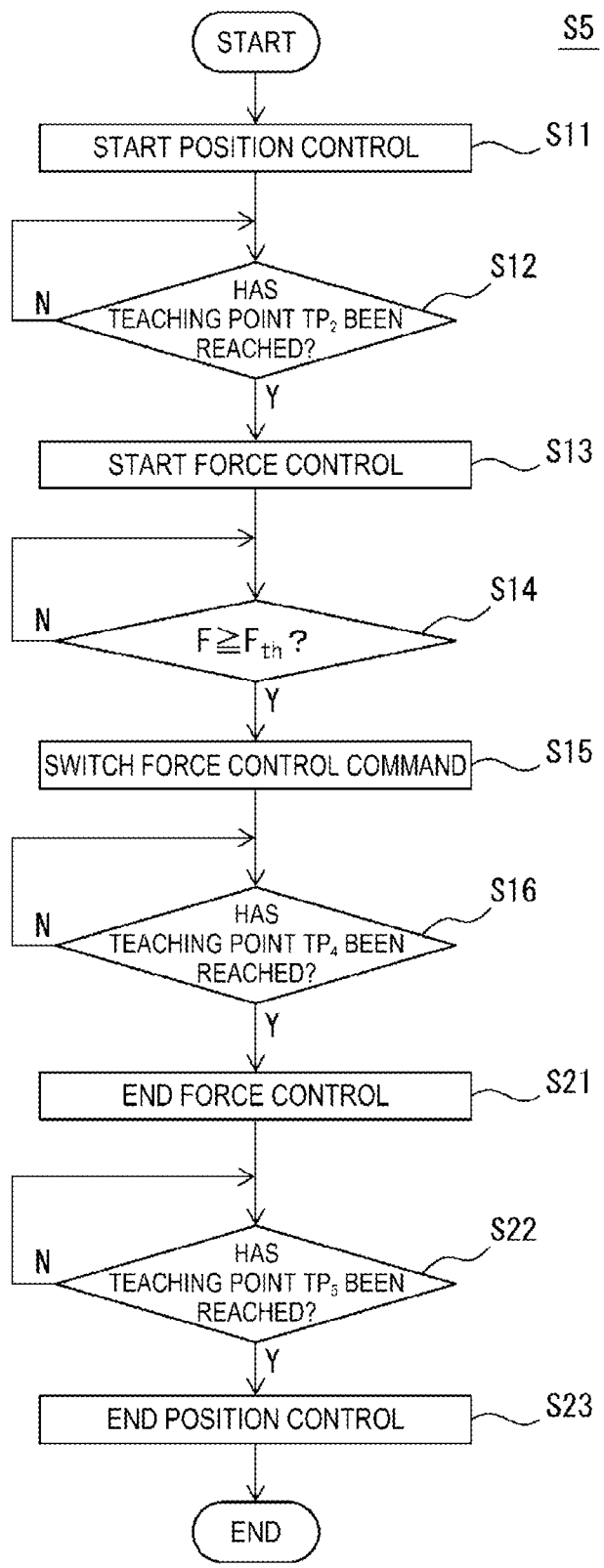
FIG. 18 illustrates another example of a flow of the step S5 in FIG. 14.

Next, the operation flow of the robot system 10 for a case in which the teaching points $TP_n$ are set as illustrated in FIG. 17 will be described with reference to FIG. 14, FIG. 18, and FIG. 19. In the present embodiment, although the processor 40 executes the flow illustrated in FIG. 14, the flow according to the present embodiment differs in step S5 from the flow according to the above-described embodiment. In the following, step S5 according to the present embodiment will be described with reference to FIG. 18.

After the start of step S5, the processor 40 executes steps S11 to S16 in the same manner as the embodiment described above. Accordingly, as illustrated in FIG. 19, the scraper 16 moves from the teaching point $TP_1$ to the teaching point $TP_2$, and then moves toward the surface Q1 of the workpiece W1 in the trajectory TR inclined at the acute angle θ2 and abuts against the surface Q1 at the position P1.

Figure 20:
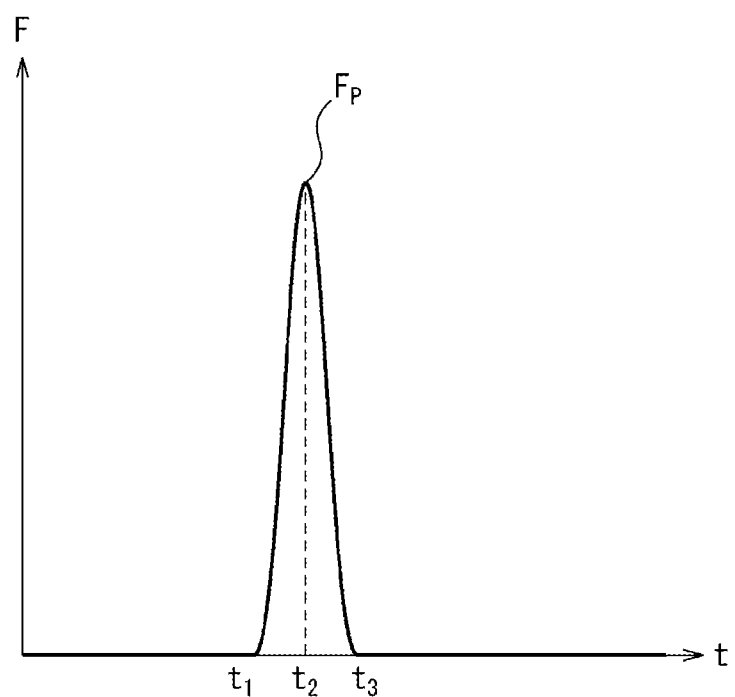
FIG. 20 illustrates still another example of a time change characteristic of a pressing force at which the robot presses the scraper against a surface of a workpiece during the scraping process executed by the robot system illustrated in FIG. 1.

During the scraper 16 abutting against the surface Q1, the processor 40 causes the scraper 16 to move in the direction MD (rightward) in accordance with the position control command $PC_2$ and $PC_3$ and generates the speed command $FC_{V\_1}$ for controlling the pressing force F to the target value $F_T$ through the force control. FIG. 20 illustrates a time change characteristic of the pressing force F when the processor 40 executes the force control according to the present embodiment. The pressing force F rapidly increases from a time point $t_1$ at which the scraper 16 abuts against the surface Q1 at the position P1 by the force control.

Here, in the present embodiment, the processor 40 generates the force control command FC (specifically, the speed command $FC_{V\_1}$) and controls the position of the hand-tip portion 28b of the robot 12 such that the pressing force F reaches the peak value $F_P$ at a time point t2 at which the scraper 16 reaches a position corresponding to the teaching point $TP_3$ and then the pressing force F becomes zero at a time point t3 at which the scraper 16 (specifically, the distal end 32a) reaches a position corresponding to the teaching point $TP_4$ (specifically, a position below the teaching point $TP_4$), i.e., at a time point at which YES is determined in step S16. In addition, the processor 40 generates the position control command $PC_3$ and the force control command FC such that the scraper 16 is in a state of abutting against the surface Q1 of the workpiece W1 at the time point t3.

Referring to FIG. 18 again, when YES is determined in step S16 (at the time point t3), the processor 40 ends the force control in step S21. After step S21, the processor 40 causes the robot 12 to operate in accordance with a position control commands $PC_4$ such that the scraper 16 is moved toward upper right along the trajectory TR inclined at the acute angle θ3 as illustrated in FIG. 19, and as a result, the scraper 16 is separated from the surface Q1 of the workpiece W1 at the position P2, and the scraping process is ended.

In step S22, the processor 40 determines whether or not the scraper 16 has reached a position corresponding to the teaching point $TP_5$. The processor 40 proceeds to step S23 upon determining YES, or loops step S22 upon determining NO. In step S23, the processor 40 ends the position control.

As described above, in the present embodiment, the force control is executed such that the pressing force F reaches the peak value $F_P$ at the time point t2 at which the scraper 16 reaches the teaching point $TP_3$ and then the pressing force F becomes zero at the time point t3 at which the scraper 16 reaches the teaching point $TP_4$. According to this configuration, the time change characteristic of the pressing force F illustrated in FIG. 20 can be controlled more precisely, and thus can be effectively brought close to the time change characteristic of the pressing force $F_R$ when the scraping process is executed by the expert.

Note that, in the above-described embodiment, the processor 40 may change the force control command depending on a thickness H of the workpiece W in the z-axis direction of the robot coordinate system C1. This function will be described below. FIG. 21 illustrates an actual trajectory TR' of the scraper 16 when the processor 40 executes the flow illustrated in FIG. 14 on a workpiece W2 having a thickness H that is thinner than the workpiece W1 illustrated in FIG. 8. In FIG. 21, for a comparison purpose, the workpiece W1 and the trajectory TR illustrated in FIG. 8 are respectively depicted and superimposed by a dotted line and a double dot-dash line, respectively.

In the configuration illustrated in FIG. 21, the teaching points $TP_n$ (n=1 to 4) are set at the same position in the robot coordinate system C1 as in the configuration of FIG. 8. As illustrated in FIG. 21, while the workpiece W1 has a thickness $H_1$ in the z-axis direction of the robot coordinate system C1, the workpiece W2 has a thickness $H_2$ thinner than the thickness $H_1$ (<$H_1$).

When the processor 40 executes the scraping process on the workpiece W2, the distal end 32a of the scraper 16 passes through the position P1, and then abuts against a surface Q2 of the workpiece W2 at a position P1' located at the lower right of the position P1. Then, as in the case of the above-described embodiment, the processor 40 starts an operation of causing the hand-tip portion 28b of the robot 12 to move upward before reaching the teaching point $TP_3$, and thereby the scraper 16 is separated from the surface Q2 at a position P2' located below the position P2.

Figure 22:
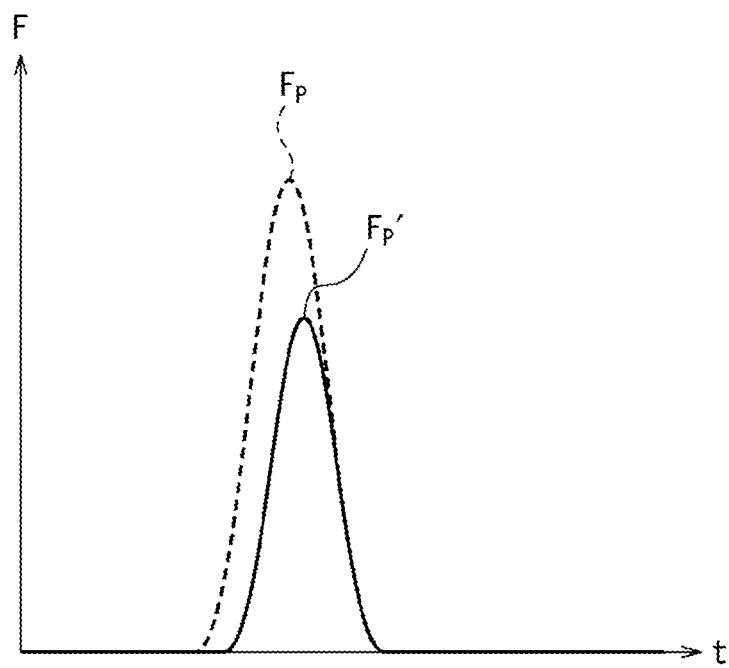
FIG. 22 illustrates a time change characteristic of a pressing force at which the robot presses the scraper against a surface of a workpiece during the scraping process executed on the workpiece illustrated in FIG. 21.

The time change characteristic of the pressing force F when the scraping process is executed as described above is indicated by a solid line in FIG. 22. In FIG. 22, for a comparison purpose, the time change characteristic of the pressing force F for the scraping process executed on the workpiece W1 illustrated in FIG. 8 (corresponding to FIG. 13) is indicated and superimposed by a dashed line. As illustrated in FIG. 22, when the scraping process is performed on the workpiece W2 having a thinner thickness, a peak value $F_P'$ of the pressing force become smaller than the peak value $F_P$ for the scraping process performed on the workpiece W1. In this case, there is a possibility that pressing of the scraper 16 against the surface Q2 of the workpiece W2 may be insufficient and thus the depth E of the recess R to be formed may be smaller than a desired depth.

Thus, in the present embodiment, the processor 40 changes, depending on the thickness H of the workpiece W, the speed command $FC_{V\_1}$ (speed $V_{F\_1}$) to be generated during the force control. The speed command $FC_{V\_1}$ can be changed by changing a gain G, a maximum rotation speed $V_{MAX}$ of the servo motor 34, or a time constant T that are for generating the speed command $FC_{V\_1}$.

Here, the speed command $FC_{V\_1}$ is generated by multiplying the detection data of the force sensor 14 (or the pressing force F) by the gain G, and the gain G is a parameter that defines a response speed in operating the servo motor 34 by the force control. The time constant T defines a time required to accelerate and decelerate the speed V of the servo motor 34 from/to zero to/from the maximum rotation speed $V_{MAX}$.

The speed command $FC_{V\_1}$ can be increased as the gain G and the maximum rotation speed $V_{MAX}$ are increased or as the time constant T is decreased, and thereby a gradient (differential value) of the time change characteristic of the pressing force F illustrated in FIG. 22 can be increased. By increasing the gradient of the time change characteristic of the pressing force F, the pressing force F can reach the peak value $F_P$ (or the target value $F_T$) in a shorter time during the force control.

As an example, the memory 42 of the control device 18 stores in advance a data table DT1 indicating the relationship among a thickness H of the workpiece W, a gain G, a maximum rotation speed $V_{MAX}$, and a time constant T. In the data table DT1, a gain G, a maximum rotation speed $V_{MAX}$, and a time constant T, which can ensure a peak value $F_P$ having a sufficient magnitude during the execution of the force control, are stored in association with a thicknesses H. The data table DT1 can be created by accumulating datasets of a gain G, a maximum rotation speed $V_{MAX}$, a time constant T, and a thickness H, for example, through an experimental technique or a simulation.

On the other hand, the operator measures the thickness H of the workpiece W before the processor 40 executes the flow illustrated in FIG. 14. Then, after the processor 40 starts the flow illustrated in FIG. 14, the operator inputs the measured thickness H of the workpiece W, as the machining conditions MC, in addition to the distance $x_1$, the distance $z_1$, the acute angle $\theta 2$, the speed $V_{F\_0}$ (speed command $FC_{V\_0}$), the speed $V_{P\_2}$ (speed command $PC_{V\_2}$), and the target value $F_T$ described above.

Then, the processor 40 receives the input of the thickness H and determines YES in step S1. Next, in step S2, the processor 40 searches, in the data table DT1, for a gain G, a maximum rotational speed $V_{MAX}$, and a time constant T, corresponding to the input thickness H, and sets the thickness H, the gain G, the maximum rotation speed $V_{MAX}$, and the time constant T as the machining conditions MC. That is, in the present embodiment, the machining conditions MC further include a thickness H, a gain G, a maximum rotation speed $V_{MAX}$, and a time constant T, in addition to a distance $x_1$, a distance $z_1$, an acute angle $\theta 2$, a speed $V_{F\_0}$ (speed command $FC_{V\_0}$), a speed $V_{P\_2}$ (speed command $PC_{V\_2}$), and a target value $F_T$.

Figure 23:
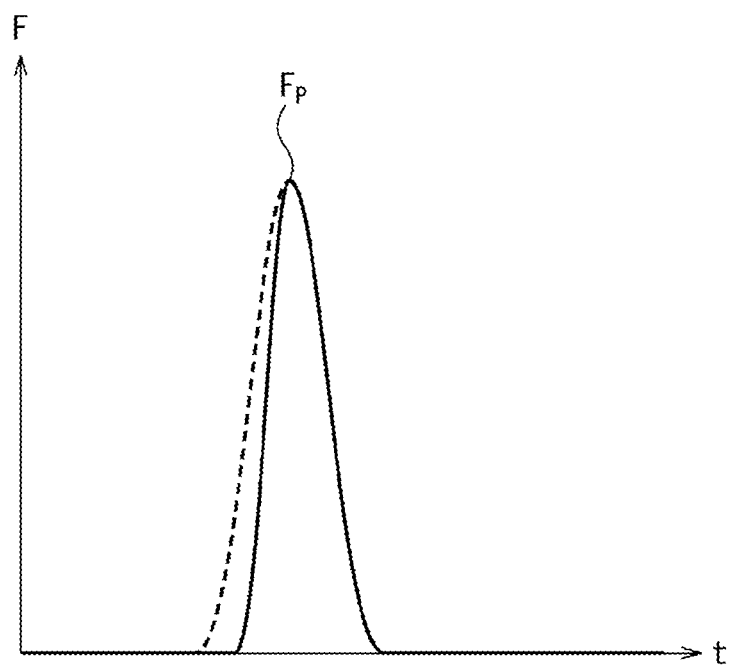
FIG. 23 illustrates a time change characteristic of a pressing force at which the robot presses the scraper against a surface of a workpiece during the scraping process executed on the workpiece illustrated in FIG. 21.

Then, after determining YES in step S14 in step S5, the processor 40 generates the speed command $FC_{V\_1}$ corresponding to the thickness H of the workpiece W by using the gain G, the maximum rotational speed $V_{MAX}$, and the time constant T set in step S2, and thereby executes the force control. FIG. 23 illustrates a time change characteristic of a pressing force F when the operation flow according to the present embodiment is executed on the workpiece W2.

As illustrated in FIG. 23, according to the present embodiment, the gradient of changes in the pressing force F increases compared to the characteristic in FIG. 22 as the speed command $FC_{V\_1}$ is increased depending on a thickness $H_2$ of the workpiece W2, and as a result the pressing force F reaches the peak value $F_P$ in a shorter time. Thus, the scraper 16 can be pressed against the surface Q2 of the workpiece W2 at a sufficient pressing force F, and thus the depth E of the recess R can be made to be a desired value.

Note that, in the present embodiment, the gain G, the maximum rotation speed $V_{MAX}$, and the time constant T have been exemplified as parameters for changing the speed command $FC_{V\_1}$. However, no such limitation is intended, and any parameters that can change the speed command $FC_{V\_1}$ may be used. Not limited to the speed command $FC_{V\_1}$, the processor 40 may change a torque command to the servo motor 34 depending on the thickness H of the workpiece W in order to cause the pressing force F to quickly reach the peak value $F_P$ during the force control.

Note that the processor 40 may change the positions of the teaching points $TP_3$ and $TP_3$ depending on the thickness H of the workpiece W instead of changing the speed command $FC_{V\_1}$ in order to ensure the peak value $F_P$ having a sufficient magnitude during the force control. This function will be described below with reference to FIG. 24. As an example, the memory 42 of the control device 18 stores in advance a data table DT2 indicating the relationship among a thickness H of the workpiece W, a shift amount $\delta_3$ of the teaching point $TP_3$, and a shift amount $\delta_4$ of the teaching point $TP_4$. Note that shift amounts $\delta_3$ and $\delta_4$ may be identical to or different from each other.

In the data table DT2, shift amounts $\delta_3$ and $\delta_4$ that can ensure a peak value $F_P$ having a sufficient magnitude during the execution of the force control are stored in association with a thicknesses H. The data table DT2 can be created by accumulating datasets of shift amounts $\delta_3$ and $\delta_4$, and a thickness H, for example, through an experimental technique or a simulation.

On the other hand, as in the case of the embodiment described above with reference to FIG. 21 and FIG. 23, the operator measures a thickness H of the workpiece W in advance, and inputs the thickness H of the workpiece W as the machining conditions MC in step S1 in FIG. 14. In step S2, the processor 40 searches for shift amounts $\delta_3$ and $\delta_4$ corresponding to the input thickness H in the data table DT2.

Then, the processor 40 acquires position data (specifically, coordinates in the robot coordinate system C1) of a new teaching point $TP_3'$ (FIG. 24) obtained by shifting the predetermined teaching point $TP_3$ rightward by the shift amount $\delta_3$ and position data of a new teaching point $TP_4'$ obtained by shifting the predetermined teaching point $TP_4$ rightward by the shift amount $\delta_4$.

Figure 25:
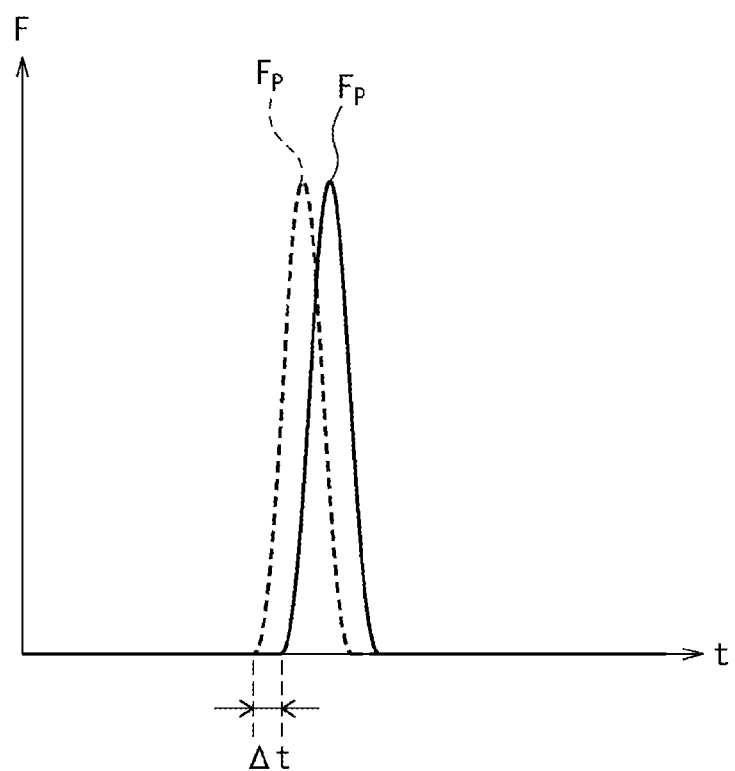
FIG. 25 illustrates a time change characteristic of a pressing force at which the robot presses the scraper against a surface of a workpiece during the scraping process executed on the workpiece illustrated in FIG. 24.

Thereafter, the processor 40 executes steps S3 to S7 in sequence to perform the scraping process. In FIG. 24, a trajectory TR" of the scraper 16 for a case in which the operation flow according to the present embodiment is executed on the workpiece W2 is indicated by a solid line. As illustrated in FIG. 24, in the present embodiment, the scraper 16 moves along the trajectory TR", abuts against the surface Q1 of the workpiece W1 at the position P1', moves rightward along the surface Q1, and then is separated from the surface Q1 at a position P2". The time change characteristic of the pressing force F at this time is illustrated in FIG. 25. In FIG. 25, for a comparison purpose, the time change characteristic of the pressing force F when the scraping process is executed on the workpiece W1 (corresponding to FIG. 13) is indicated by a dashed line.

As illustrated in FIG. 25, according to the present embodiment, although the pressing force F starts to increase with a delay by a time $\Delta t$ that is required for the scraper 16 to move from the position P1 to the position P1' in FIG. 24 as compared to the scraping process executed on the workpiece W1, the peak $F_P$ is achieved. Thus, the scraper 16 can be pressed against the surface Q2 of the workpiece W2 at a sufficient pressing force F, and thus the depth E of the recess R can be made to be a desired value.

In the above-described embodiments, cases have been described in which the thickness H of the workpiece W is measured by the operator. However, no such limitation is intended, and the processor 40 may acquire a thickness H when executing the first scraping process on the workpiece W. Specifically, upon determining YES in step S14, the processor 40 acquires a z-axis coordinate $z_2$ of the distal end 32a (TCP) of the scraper 16 in the robot coordinate system C1 based on the feedback from the rotation detectors of the servo motors 34.

On the other hand, a z-axis coordinate $z_3$ of a placement surface (not illustrated) on which the workpiece W is placed is previously known and stored in advance in the memory 42. The processor 40 can calculate the thickness H of the workpiece W by an equation $H=z_2-z_3$. Then, when performing the second scraping process on the workpiece W, the processor 40 may executes the force control to cause the pressing force F to reach the peak value $F_P$ by the method described above with reference to FIG. 23 or FIG. 25.

Note that, in the embodiments described above, the processor 40 may automatically determine the target value $F_T$ of the force control depending on a target depth E of the recess R. This function will be described below. Here, the depth E of the recess R formed by the scraping process and the target value $F_T$ of the force control executed during the scraping process are highly correlated with each other. Specifically, the peak value $F_P$ of the pressing force F during the scraping process becomes higher as the target value $F_T$ is set to be higher, and thus the depth E of the recess R to be formed becomes deeper.

As an example, the memory 42 of the control device 18 stores in advance a data table DT3 in which a depth E and a target value $F_T$ (or a peak value $F_P$) are stored in association with each other. The data table DT3 can be created by accumulating datasets of a depth E and a target value $F_T$, for example, through an experimental technique or a simulation.

After the processor 40 starts the flow illustrated in FIG. 14, the operator inputs a target depth E as the machining conditions MC. Then, the processor 40 receives the input of the target depth E and determines YES in step S1. Next, in step S2, the processor 40 searches for a target value $F_T$ corresponding to the input target depth E in the data table DT3 and sets the target value as the machining conditions MC.

Then, after the start of step S13, the processor 40 executes the force control using the set target value $F_T$, and thereby the recess R having the target depth E is formed. As described above, in the present embodiment, depending on the target depth E input by the operator, the processor 40 automatically determines the target value $F_T$ that can achieve the target depth E, and thereby executes the force control. According to this configuration, the depth E of the recess R formed by the scraping process can be controlled to a desired value.

Note that, in the embodiments described above, the processor 40 may automatically determine an incident angle $\theta 2$ depending on the target depth E of the recess R. This function will be described below. Here, the depth E of the recess R formed by the scraping process and the incident angle $\theta 2$ are highly correlated with each other. For example, the depth E of the recess R to be formed can become shallower as the incident angle $\theta 2$ is set to be smaller.

As an example, the memory 42 of the control device 18 stores in advance a data table DT4 in which a depth E and an incident angle $\theta 2$ are stored in association with each other. The data table DT4 can be created by accumulating datasets of a depth E and an incident angle $\theta 2$, for example, through an experimental technique or a simulation.

After the processor 40 starts the flow illustrated in FIG. 14, the operator inputs, as the machining conditions MC, a target depth E and one of the speed commands $FC_{V\_0}$ and $PC_{V\_2}$ (or distances $x_1$ and $z_1$) in the above-described equation (2). Then, the processor 40 receives the input of the machining conditions MC and determines YES in step S1.

Next, in step S2, the processor 40 searches for an incident angle $\theta 2$ corresponding to the input target depth E in the data table DT4 and sets the incident angle $\theta 2$ as the machining conditions MC. Also, the processor 40 automatically sets the other one of the speed commands $FC_{V\_0}$ and $PC_{V\_2}$ (or distances $x_1$ and $z_1$) by the above-described equation (1).

In this way, in the present embodiment, depending on the target depth E input by the operator, the processor 40 automatically determines an incident angle $\theta 2$ that can achieve the target depth E, and automatically sets the incident angle $\theta 2$ as the machining conditions MC. According to this configuration, the depth E of the recess R formed by the scraping process can be controlled to a desired value.

Note that the data table DT4 may store, instead of an incident angle $\theta 2$, an angle $\theta 1$ described above in association with a target depth E. The angle $\theta 1$ is also highly correlated with the depth E of the recess R. In this case, in step S2, the processor 40 searches for an incident angle $\theta 1$ corresponding to the input target depth E in the data table DT4 and sets the incident angle $\theta 1$ as the machining conditions MC.

In the embodiments described above, cases have been described in which the processor 40 controls the pressing force F to have a predetermined magnitude during the scraping process (FIG. 13, FIG. 20, FIG. 23, and FIG. 25) by executing the position control together with the force control. However, no such limitation is intended, and the processor 40 can control the pressing force F to have a predetermined magnitude and execute the scraping process by executing the position control only. This function will be described with reference to FIG. 26.

Figure 26:
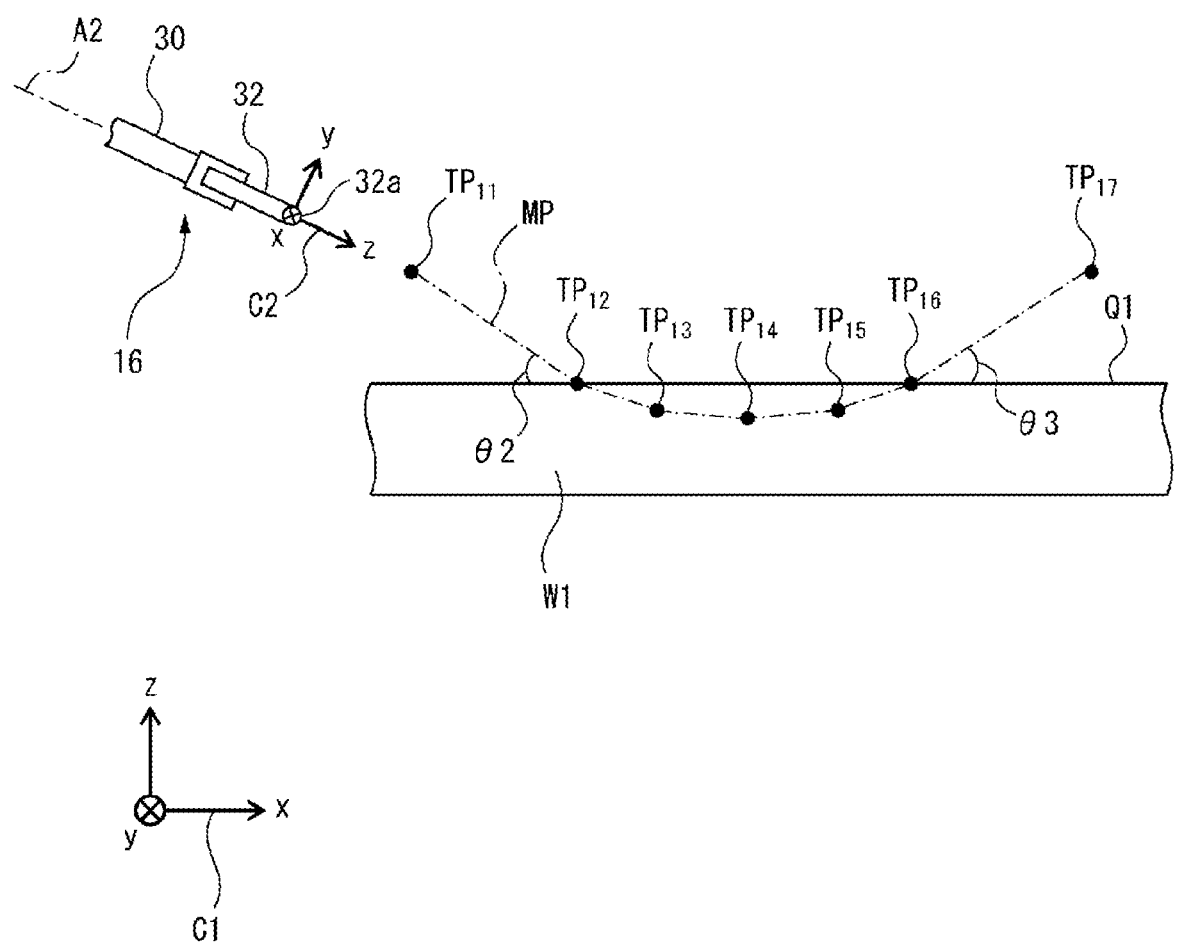
FIG. 26 illustrates still another example of teaching points set with respect to a surface of a workpiece.

In the configuration illustrated in FIG. 26, teaching points $TP_{11}$, $TP_{12}$, $TP_{13}$, $TP_{14}$, $TP_{15}$, $TP_{16}$, and $TP_{17}$ are set along the surface Q1 of the workpiece W1. Here, the teaching point $TP_{12}$ and the teaching point $TP_{16}$ are arranged at the same positions as the surface Q1 in the z-axis direction in the robot coordinate system C1, and the teaching points $TP_{13}$, $TP_{14}$, and $TP_{15}$ are arranged at positions below the surface Q1 in the robot coordinate system C1. Among these teaching points $TP_n$ (n=11 to 17), the teaching point $TP_{14}$ is arranged at the lowest side in the robot coordinate system C1.

In this configuration, the processor 40 executes the position control to cause the scraper 16 to move to the teaching points $TP_{11} \rightarrow TP_{12} \rightarrow TP_{13} \rightarrow TP_{14} \rightarrow TP_{15} \rightarrow TP_{16} \rightarrow TP_{17}$ in this order. Specifically, the processor 40 causes the robot 12 to move the scraper 16 from the teaching point $TP_{11}$ to the teaching point $TP_{12}$.

Accordingly, the scraper 16 moves in a direction along the surface Q1 of the workpiece W (rightward) and in a direction toward the surface Q1 (downward), and abuts against the surface Q1 of the workpiece W in a trajectory inclined at an incident angle $\theta 2$ at the teaching point $TP_{12}$. In the present embodiment, the incident angle $\theta 2$ is defined by the movement path MP from the teaching point $TP_{11}$ to the teaching point $TP_{12}$.

Subsequently, the processor 40 causes the hand-tip portion 28b of the robot 12 to further move to the lower right toward positions corresponding to the teaching points $TP_{13}$ and $TP_{14}$, and then move to the upper right toward positions corresponding to the teaching points $TP_{15}$ and $TP_{16}$. During this, the processor 40 causes the distal end 32a of the scraper 16 to move rightward while the distal end 32a is pressed against the surface Q1 of the workpiece W at the pressing force F.

Then, the processor 40 causes the scraper 16 to move from the teaching point $TP_{16}$ to the teaching point $TP_{17}$, and thus the scraper 16 is separated from the surface Q1 in a trajectory that is inclined to form an acute angle $\theta 3$ with the surface Q1. Accordingly, the recess R having a length from the teaching point $TP_{12}$ to the teaching point $TP_{16}$ is formed in the surface Q1.

Here, by appropriately selecting positions of the teaching points $TP_n$, the pressing force F during the execution of the scraping process can be controlled to have the time change characteristic illustrated in FIG. 13. As an example, the memory 42 stores in advance a data table DT5 in which position data of the teaching points $TP_n$ (coordinates in the robot coordinate system C1) and a magnitude (or time change characteristic) of the pressing force F are stored in association with each other.

The data table DT5 enables the setting of the position data of the teaching points $TP_n$ that can control the pressing force F during the execution of the scraping process to have a desired magnitude. By executing the position control in accordance with the teaching points $TP_n$, the processor 40 can control the pressing force F during the scraping process to have a magnitude (time change characteristic) stored in advance in the data table DT5.

In the above-described embodiments, cases have been described in which the scraping process is executed once on the surface Q1 of the workpiece W. However, the processor 40 may repeatedly execute the scraping process a plurality of times in order to form a plurality of recesses R queuing in the surface Q of the workpiece W. In that case, a group of teaching points $TP_n$ illustrated in FIG. 6, FIG. 17, or FIG. 26 is set for each of the plurality of recesses R to be formed.

For example, when a group of teaching points $TP_n$ (n=1 to 4) illustrated in FIG. 6 is set for each of the plurality of recesses R, the processor 40 executes, in the flow illustrated in FIG. 14, the first step S5 for the first group of teaching points $TP_n$ that has been set to form the first recess R, and then executes the second step S5 for the second group of teaching points $TP_n$ that has been set to form the second recess R. In this way, by executing the m-th step S5 for the m-th group of teaching points $TP_n$ that has been set to form the m-th recess R (m=1, 2, 3, . . . ), the processor 40 can repeatedly execute the scraping process to form the plurality of recesses R.

Note that the memory 42 may store in advance a data table DT6 of a distance $x_1$ or $z_1$ and a depth E of the recess R. Then, in step S2 described above, the processor 40 searches for a distance $x_1$ or $z_1$ corresponding to the input target depth E in the data table DT6 and sets them as the machining conditions MC. The distance $x_1$ or $z_1$ is also highly correlated with the depth E of the recess R to be formed.

In the above-described embodiments, cases have been described in which the teaching point $TP_2$ is set such that the distal end 32a of the scraper 16 is separated upward from the surface Q1. However, no such limitation is intended, and the teaching point $TP_2$ may be arranged at the same position as (or below) the surface Q1 in the robot coordinate system C1. In that case, the incident angle θ2 described above is defined by the movement path MP from the teaching point $TP_1$ to the teaching point $TP_2$.

For example, the force sensor 14 may be interposed between a work cell and the robot base 20, or may be provided at any portion of the robot 12. The force sensor 14 may be provided, not only at the robot 12, but also at the workpiece W side. For example, the pressing force F can be detected by interposing the force sensor 14 between the workpiece W and a placement surface on which the workpiece W is placed. The force sensor 14 is not limited to a six-axis force sensor, and may be, for example, a single-axis or a three-axis force sensor, or may be any sensor capable of detecting the pressing force F.

In the above-described embodiments, cases have been described in which the origin of the tool coordinate system C2 is arranged at the distal end 32a of the scraper 16. However, no such limitation is intended, and the origin of the tool coordinate system C2 may be arranged, for example, at the center of the hand-tip portion 28b (wrist flange), or may be arranged at any position as long as the position is previously known with respect to the hand-tip portion 28b.

In addition, the origin of the sensor coordinate system C3 may be arranged, not only at the center of the force sensor 14, but also at any position as long as the position is previously known with respect to the force sensor 14, and the axes of the sensor coordinate system C3 may be defined in any directions. Also, the origin of the robot coordinate system C1 may be arranged, not only at the center of the robot base 20, but also at any position as long as the position is previously known with respect to the robot 12, and the axes of the robot coordinate system C1 may be defined in any directions. Although the present disclosure is described above through the embodiments, the above-described embodiments do not limit the invention according to the claims.

REFERENCE SIGNS LIST

10 ROBOT SYSTEM
12 ROBOT
14 FORCE SENSOR
16 SCRAPER
18 CONTROL DEVICE
40 PROCESSOR

The invention claimed is:

1. A robot system configured to perform a scraping process to scrape and smoothen a surface of a workpiece, the robot system comprising:
    a robot configured to move a scraper for scraping the surface; and
    a control device configured to control the robot, wherein the control device is configured to:
        abut the scraper against the surface in a trajectory, which is inclined so as to form an acute angle with respect to the surface, by moving the scraper by the robot in a direction along the surface and in a direction toward the surface; and
        during the scraper abutting against the surface, control a position of the robot such that a pressing force, by which the robot presses the scraper against the surface, becomes a predetermined magnitude while moving the scraper by the robot in the direction along the surface, to perform the scraping process.

2. The robot system of claim 1, further comprising a force sensor configured to detect the pressing force, wherein
    the control device controls the position of the robot by executing force control for controlling the pressing force to a target value corresponding to the predetermined magnitude based on detection data of the force sensor, during the scraper abutting against the surface.

3. The robot system of claim 2, wherein the control device is configured to:
    generate a position control command for sequentially moving the scraper to a plurality of teaching points which are predetermined along the surface;
    generate a force control command for starting the force control to move the scraper in the direction toward the surface, when the scraper is moved to a first teaching point separated from the surface; and abut the scraper against the surface in the inclined trajectory by moving the scraper from the first teaching point to a second teaching point in accordance with the position control command, and moving the scraper in the direction toward the surface in accordance with the force control command.

4. The robot system of claim 3, wherein the position control command includes a first speed command defining a speed for moving the scraper from the first teaching point to the second teaching point, wherein
the force control command includes a second speed command defining a speed for moving the scraper in the direction toward the surface, and wherein
the control device is configured to generate the first speed command and the second speed command such that the acute angle is within a predetermined range.

5. The robot system of claim 2, wherein the control device is configured to end the scraping process by moving the scraper in a direction away from the surface when or before the pressing force reaches the target value during execution of the force control.

6. The robot system of claim 2, wherein the control device is configured to continuously execute the scraping process such that the pressing force is continuously maintained at the target value after the pressing force reaches the target value by the force control.

7. The robot system of claim 1, wherein the control device is configured to end the scraping process by separating the scraper away from the surface in a trajectory, which is inclined so as to form an acute angle with respect to the surface, during execution of the scraping process.

8. The robot system of claim 1, wherein the scraper includes:
a flexible handle connected to a hand-tip portion of the robot; and
a blade portion fixed to a distal end of the handle and configured to scrape the surface, wherein
the magnitude of the pressing force is determined such that the handle is bended when the blade portion is pressed against the surface during execution of the scraping process.

9. A method of performing a scraping process to scrape and smoothen a surface of a workpiece, using a robot configured to move a scraper for scraping the surface, the method comprising:
abutting the scraper against the surface in a trajectory, which is inclined so as to form an acute angle with respect to the surface, by moving the scraper by the robot in a direction along the surface and in a direction toward the surface; and
during the scraper abutting against the surface, controlling a position of the robot such that a pressing force, by which the robot presses the scraper against the surface, becomes a predetermined magnitude while moving the scraper by the robot in the direction along the surface, to perform the scraping process.

10. A computer-readable storage medium configured to store a computer program for causing a processor to execute the method of claim 9.

* * * * *